US008033477B2

(12) United States Patent
Jones et al.

(10) Patent No.: US 8,033,477 B2
(45) Date of Patent: Oct. 11, 2011

(54) OPTICALLY VARIABLE PERSONALIZED INDICIA FOR IDENTIFICATION DOCUMENTS

(75) Inventors: Robert L. Jones, Andover, MA (US);
Daoshen Bi, Boxborough, MA (US);
Charles F. Duggan, Merrimack, NH (US); Nelson T. Schneck, Hollis, NH (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 0 days.

(21) Appl. No.: 12/758,332

(22) Filed: Apr. 12, 2010

(65) Prior Publication Data

US 2011/0057040 A1   Mar. 10, 2011

Related U.S. Application Data

(63) Continuation of application No. 11/020,651, filed on Dec. 23, 2004, now Pat. No. 7,694,887, which is a continuation-in-part of application No. 10/330,032, filed on Dec. 24, 2002, now Pat. No. 7,063,264, and a continuation-in-part of application No. 10/411,354, filed on Apr. 9, 2003, now Pat. No. 7,815,124, and a continuation-in-part of application No. 10/848,526, filed on May 17, 2004, now abandoned.

(60) Provisional application No. 60/532,534, filed on Dec. 23, 2003, provisional application No. 60/344,686, filed on Dec. 24, 2001, provisional application No. 60/371,335, filed on Apr. 9, 2002, provisional application No. 60/429,115, filed on Nov. 25, 2002, provisional application No. 60/471,429, filed on May 16, 2003.

(51) Int. Cl.
*G06K 19/06*  (2006.01)
*G06K 7/08*   (2006.01)
*G06K 5/00*   (2006.01)

(52) U.S. Cl. ........ 235/492; 235/375; 235/380; 235/449; 235/451; 235/487; 235/488; 235/494; 283/72; 283/81; 283/84; 283/86

(58) Field of Classification Search ................. 235/375, 235/380, 449, 451, 487, 492, 494; 283/73, 283/74, 75, 77, 80, 81, 107
See application file for complete search history.

(56) References Cited

U.S. PATENT DOCUMENTS

| | | | | |
|---|---|---|---|---|
| 5,157,424 A | * | 10/1992 | Craven et al. | 346/107.2 |
| 5,492,370 A | * | 2/1996 | Chatwin et al. | 283/110 |
| 6,066,594 A | * | 5/2000 | Gunn et al. | 503/227 |
| 6,415,053 B1 | * | 7/2002 | Norimatsu | 382/199 |
| 7,026,092 B1 | * | 4/2006 | Double et al. | 430/200 |

* cited by examiner

*Primary Examiner* — Thien M. Le
*Assistant Examiner* — Tuyen Vo
(74) *Attorney, Agent, or Firm* — Mintz, Levin, Cohn, Ferris, Glovsky and Popeo, P.C.

(57) ABSTRACT

The invention relates to identification documents, and in particular to providing optically variable personalized data to identification documents. In one implementation, we provide an identification document comprising a document layer and a first indicium. The document layer comprises a material capable of being printed by a thermally transferable optically variable ink. The first indicium is printed on the document layer and comprises personalized data and printed to the document layer by a thermally transferred optically variable ink. The first indicium may be printed to the document layer by disposing a thermally transferable optically variable ink in a mass transfer panel of a printer ribbon adapted for use in a dye diffusion thermal transfer printer, and printing the first indicium as part of a mass transfer printing process. The thermally transferred optically variable ink can be selected and printed such that the first indicium has at least one of a luster, shine, sheen, pearlescent appearance, iridescent appearance, and mirror-like appearance. This technology enables the creation of a halftone "mirror image" over a color ghost image to achieve a layered and linked multiple personalization scheme of ID documents.

12 Claims, 29 Drawing Sheets

(C)

(D)

(A)

(B)

(A)

(B)

(C)

(D)

(E)

(A)

(B)

(C)

(D)

(A)

(B)

US 8,033,477 B2

OPTICALLY VARIABLE PERSONALIZED INDICIA FOR IDENTIFICATION DOCUMENTS

RELATED APPLICATION DATA

This application is a continuation of Ser. No. 11/020,651, filed Dec. 23, 2004, which claims priority to provisional application 60/532,534, filed Dec. 23, 2003, which is hereby incorporated by reference.

The Ser. No. 11/020,651 application, filed Dec. 23, 2004, is a continuation in part of the following patent applications:

Ser. No. 10/330,032, filed Dec. 24, 2002, which claims the benefit of application 60/344,686, filed Dec. 24, 2001;

Ser. No. 10/411,354, filed Apr. 9, 2003, which claims the benefit of applications 60/371,335, filed Apr. 9, 2002, and 60/429,115, filed Nov. 25, 2002; and Ser. No. 10/848,526, filed May 17, 2004, which claims the benefit of 60/471,429, filed May 16, 2003.

Each of the above U.S. Patent documents is herein incorporated by reference in its entirety. The present invention is also related to U.S. patent application Ser. No. 09/747,735, filed Dec. 22, 2000 (US Patent Pub. 2003/0038174), Ser. No. 09/602,313, filed Jun. 23, 2000 (now U.S. Pat. No. 6,752,432), Ser. No. 10/094,593, filed Mar. 6, 2002 (US Patent Pub. 2002/0170966), U.S. Provisional Patent Application No. 60/358,321, filed Feb. 19, 2002 and Ser. No. 10/370,421 (published as US Patent Pub. 2004/0049401), as well as U.S. Pat. No. 6,066,594. Each of the above U.S. Patent documents is herein incorporated by reference in its entirety.

TECHNICAL FIELD

The invention generally relates to identification and security documents, and in particular, relates to enhancing the formation of a covert image such as a fluorescing, ultraviolet, infrared, thermachromic and/or optical variable image on such documents. In particular, the invention relates to an optically variable indicia of personalized data formed on such documents that can have a shiny appearance or sheen, a metallic appearance, an iridescent appearance, an appearance that "reverses" from positive to negative, and/or a mirror-like appearance. The optically variable indicia can be formed anywhere on the document, and in an advantageous embodiment the optically variable indicia is oriented to or disposed in alignment with another variable indicia, such as a substantially identical non-optically variable indicia of the same personalized data.

BACKGROUND AND SUMMARY

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

(For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

As those skilled in the art know, ID documents such as drivers licenses can contain information such as a photographic image, a bar code (which may contain information specific to the person whose image appears in the photographic image, and/or information that is the same from ID document to ID document), variable personal information, such as an address, signature, and/or birthdate, biometric information associated with the person whose image appears in the photographic image (e.g., a fingerprint), a magnetic stripe (which, for example, can be on the a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

An exemplary ID document can comprise a core layer (which can be pre-printed), such as a light-colored, opaque material (e.g., TESLIN (available from PPG Industries) or polyvinyl chloride (PVC) material). The core is laminated with a transparent material, such as clear PVC to form a so-called "card blank". Information, such as variable personal information (e.g., photographic information), is printed on the card blank using a method such as Dye Diffusion Thermal Transfer ("D2T2") printing (described further below and also described in commonly assigned U.S. Pat. No. 6,066,594, which is incorporated herein by reference in its entirety.) The information can, for example, comprise an indicium or indicia, such as the invariant or nonvarying information common to a large number of identification documents, for example the name and logo of the organization issuing the documents. The information may be formed by any known process capable of forming the indicium on the specific core material used.

To protect the information that is printed, an additional layer of transparent overlaminate can be coupled to the card blank and printed information, as is known by those skilled in the art. Illustrative examples of usable materials for overlaminates include biaxially oriented polyester or other optically clear durable plastic film.

In the production of images useful in the field of identification documentation, it may be desirable to embody into a document (such as an ID card, drivers license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16, 1993 to J. W. Luening, et al. All of the aforementioned documents are hereby incorporated by reference.

Printing Information onto ID Documents

The advent of commercial apparatus (printers) for producing dye images by thermal transfer has made relatively commonplace the production of color prints from electronic data acquired by a video camera. In general, this is accomplished by the acquisition of digital image information (electronic signals) representative of the red, green and blue content of an original, using color filters or other known means. Devices such as digital cameras, optical sensors, and scanners also can provide digital image information. The digital image information is utilized to print an image onto a data carrier. For example, information can be printed using a printer having a plurality of small heating elements (e.g., pins) for imagewise heating of each of a series of donor sheets (respectively, carrying diffuseable cyan, magenta and yellow dye). The donor sheets are brought into contact with an image-receiving element (which can, for example, be a substrate) which has a layer for receiving the dyes transferred imagewise from the donor sheets. Thermal dye transfer methods as aforesaid are known and described, for example, in U.S. Pat. No. 4,621,271, issued Nov. 4, 1986 to S. Brownstein and U.S. Pat. No. 5,024,989, issued Jun. 18, 1991 to Y. H. Chiang, et al. Each of these patents is hereby incorporated by reference.

Dye diffusion thermal transfer printing ("D2T2") and thermal transfer (also referred to as mass transfer printing) are two printing techniques that have been used to print information on identification cards. For example, D2T2 has been used to print images and pictures, and thermal transfer has been used to print text, bar codes, and single color graphics.

Dye diffusion is a thermal imaging technology that allows for the production of photographic quality images. In dye diffusion printing, one or more thermally transferable dyes (e.g., cyan, yellow, and magenta) are transferred from a donor, such as a donor dye sheet or a set of panels (or ribbons) that are coated with a dye (e.g., cyan, magenta, yellow, black, etc.) to a receiver sheet (which could, for example, be part of an ID document) by the localized application of heat or pressure, via a stylus or thermal printhead at a discrete point. When the dyes are transferred to the receiver, the dyes diffuse into the sheet (or ID card substrate), where the dyes will chemically be bound to the substrate or, if provided, to a receptor coating. Typically, printing with successive color panels across the document creates an image in or on the document's surface. Dye diffusion can result in a very high printing quality, especially because the energy applied to the thermal printhead can vary to vary the dye density in the image pixels formed on the receiver, to produce a continuous tone image. Dye diffusion can have an increased cost as compared to other methods, however, because of the special dyes needed and the cost of dye diffusion ribbons. Also, the quality of dye diffusion printed image may depend at least on an ability of a mechanical printer system to accurately spatially register a printing sequence, e.g., yellow, magenta, cyan, and black.

Another thermal imaging technology is thermal or mass transfer printing. With mass transfer printing, a material to be deposited on a receiver (such as carbon black (referred to by the symbol "K")) is provided on a mass transfer donor medium. When localized heat is applied to the mass transfer donor medium, a portion (mass) of the material is physically transferred to the receiver, where it sits "on top of" the receiver. For example, mass transfer printing often is used to print text, bar codes, and monochrome images. Resin black mass transfer has been used to print grayscale pictures using a dithered gray scale, although the image can sometimes look coarser than an image produced using dye diffusion. However, mass transfer printing can sometimes be faster than dye diffusion, and faster printing can be desirable in some situations.

Printing of black ("K") can be accomplished using either dye diffusion or mass transfer. For example, black monochrome "K" mass transfer ribbons include Kr (which designates a thermal transfer ribbon) and Kd (which designates dye diffusion).

The term "D2T2" is a combination of the following phrases "Dye Diffusion" (D2) and "Thermal Transfer" (T2); T2 is a mass transfer ribbon panel and performs in a similar fashion as any other mass transfer technology.

Both dye diffusion and thermal ink have been combined in a single ribbon (e.g., D2T2 ribbon), which is the well-known YMCK (Yellow-Magenta-Cyan-Black) ribbon (the letter "K" is used to designate the color black in the printing industry). Another panel containing a protectant ("P") or laminate (typically a clear panel) also can be added to the YMCK ribbon).

Manufacture and Printing Environments

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

In contrast, a CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner.).

Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents.

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document. It will be appreciated that an OTC card issuing process can be by its nature an intermittent—in comparison to a continuous—process.

OTC identification documents of the types mentioned above can take a number of forms, depending on cost and desired features. Some OTC ID documents comprise highly plasticized poly(vinyl chloride) or have a composite structure with polyester laminated to 0.5-2.0 mil (13-51 .mu.m) poly (vinyl chloride) film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the printhead, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the printhead. The choice of laminate dictates the degree of durability and security imparted to the system in protecting the image and other data.

UV Security Features in ID Documents

One response to the problem of counterfeiting ID documents has involved the integration of verification features that are difficult to copy by hand or by machine, or which are manufactured using secure and/or difficult to obtain materials. One such verification feature is the use in the card of a signature of the card's issuer or bearer. Other verification features have involved, for example, the use of watermarks, biometric information, microprinting, covert materials or media (e.g., ultraviolet (UV) inks, infrared (IR) inks, fluorescent materials, phosphorescent materials), optically varying images, fine line details, validation patterns or marking, and polarizing stripes. These verification features are integrated into an identification card in various ways and they may be visible or invisible (covert) in the finished card. If invisible, they can be detected by viewing the feature under conditions which render it visible. At least some of the verification features discussed above have been employed to help prevent and/or discourage counterfeiting.

Covert security features are those features whose presence is not visible to the user without the use of special tools (e.g., UV or IR lights, digital watermark readers) or knowledge. In many instances, a covert security feature is normally invisible to a user. Some technologies that involve invisible features require the use of specialized equipment, such as a detector or a device capable of reading digital watermarks. One type of covert security feature is the printing of information (images, designs, logos, patterns, text, etc.) in a material that is not visible under normal lighting conditions, but can be viewed using a special non-visible light source, such as an ultraviolet (UV) or infrared (IR) light source. Use of UV and/or IR security features can be advantageous because although the devices (for example, UV and/or IR light sources) required to see and use such features are commonly available at a reasonable cost, the ability to manufacture and/or copy at least some implementations of such features is far less common and can be very costly. UV and IR based covert security features thus can help deter counterfeiters because the features cannot be copied by copiers or scanners and are extremely difficult to manufacture without the requisite know-how, equipment, and materials.

For example, the assignee of the present invention has developed and marketed a proprietary product called PolaPrime-UV™. PolaPrime-UV™ is a type of security feature. One application of PolaPrime-UV™ is for full color photo quality printing of fixed (i.e., not variable data) fluorescent images. The artwork that can be printed using PolaPrime-UV™ includes many images that can be produced with a combination of red, green, and blue phosphors. Under the appropriate light (e.g., a light source capable of providing UV light), the effect seen when viewing an image printed with PolaPrime-UV™ is similar in appearance to a television screen in that the image is formed by emission of light rather than reflection as with ink on paper. To date, PolaPrime-UV™ has been a reliable authenticator for genuine identification documents.

Printing of Covert Materials Such as UV

Many images, such as color images, are formed by subtractive techniques, e.g., light is passed through absorbing dyes and the combination of dyes produce an image by sequentially subtracting cyan, magenta, and yellow components to provide the full color image. In the case of a UV fluorescing image, the UV image is formed by light emitting from fluorescing dyes or pigments as they are activated by a UV light or energy source. A UV image can be imparted to an ID document via methods such as thermal transfer or D2T2.

Regardless of whether the UV materials are imparted via D2T2 or mass transfer panel, both panels produce transmissive images—the mass transfer panel produces a bitonal (e.g., two tones) image and the dye sublimation panel produces a monochromatic (or shaded) image.

Optically Variable Devices for Identification Documents

Color shifting and other optically variable pigments, inks, dyes, and colorants (collectively "optically variable media") have a feature of appearing to change color as the viewing angle of an observer changes (or as the angle of incident light striking the media changes). Optically variable media have been used on security documents, such as identification cards, credit cards, checks, title documents, currency, etc. The optically variable property provides several advantages when used on security documents: (a) the presence and appearance of optically variable quality provides another "check" or method to authenticate the security document; (b) optically variable media are generally more difficult for a layman to obtain and use properly, thus helping to prevent (or at least limit) forgery and to make forgeries and/or alteration easier to detect; and (c) photocopiers and scanners generally will not reproduce many types of optically variable media, helping to reduce unauthorized reproduction or counterfeiting of such documents. Optically variable media also can be used with many other different types of articles, such as consumer goods (e.g., toys, cars), paper products (e.g., greeting cards, magazines), and in the fine arts (e.g., works of art).

Several methods exist to create optically variable media and to apply such media to security documents. One method involves dispersing in a medium (e.g., paint or ink) a plurality of relatively small particles (typically flakes) that have specific optical properties. One example of a particle can comprise a plurality of thin film layers, each film having a particular color and/or optical property. Another example of a particle that can have an optically varying appearance is described in a commonly assigned patent application Ser. No. 09/969,200 (Now U.S. Pat. No. 6,827,277), entitled "Use of Pearlescent and Other Pigments to Create Security Documents", by Bentley Bloomberg and Robert L. Jones, filed Oct. 2, 2001 (hereinafter "the '200 application"), the contents of which are incorporated by reference herein in their entirety. The '200 application describes a media having optically variable properties which includes, in one embodiment, particles comprising flat, irregularly shaped mica platelets coated with titanium dioxide and/or iron oxide. These particles, when dispersed in a media, can give a generally "pearlescent" effect, with smaller particles producing a "satin" effect and larger particles producing a "glitter" effect. In many instances, optically variable media are incorporated into a material such as a laminate layer or overlaminate layer, providing an optically variable indicia that overlays other information on the card. Generally, such an optically variable indicium contains "fixed" data (information that is the same from card to card).

For purposes of identification (e.g., of the bearer of an ID document or of the ID document itself), an ID document can include at least one image that is an "identification quality" likeness of the holder such that someone viewing the card can determine with reasonable confidence whether the holder of the card actually is the person whose image is on the card. "Identification quality" images, in at least one embodiment of the invention, include images that, when viewed using the proper facilitator (e.g., an appropriate light source for certain covert images, an appropriate temperature source for thermachromic images, etc.), provide a discernable image that is usable for identification or authentication purposes. To date, however, it has been very difficult to print images such as driver's license portraits with covert (i.e., not visible to an unaided human eye) materials and/or printing media such as UV, IR, thermachromic (materials whose appearance changes and/or becomes visible to a naked human eye with temperature), ferrofluids (materials whose appearance changes and/or becomes visible to a naked human eye upon application of a magnetic field) materials, where the quality of the covert image is sufficient to enable the image to be relied upon for identification or authentication. This can be especially difficult when attempting to print color images using covert materials.

Further, because of the enhanced security provided by the use of full color UV printing, such as is proposed in co-pending and commonly assigned U.S. patent application Ser. No. 10/330,032 (entitled "Covert Variable Information on Identification Documents and Methods of Making Same" and published as US Pub. 2003-0173406, the contents of which are incorporated herein by reference), it would be advantageous to be able to print variable or personal UV information at the time of card personalization, in one, two, or three UV colors, especially images that have a high enough quality to be used for authentication and/or identification. It also would be advantageous if the same information could be printed in a visible and invisible (e.g., UV) form at substantially the same time or at substantially the same printing step, where the covert image would be "identification quality".

Although it is known to use optically variable media on security documents, use of such media can sometimes have limitations. For example, many optically variable media are substantially opaque, which can limit both their application and use on particular types of security documents, as well as the type and/or design of indicia that are printable with such optically variable media. For example, for some types of security documents (e.g., drivers licenses, identification cards), the issuer may wish to provide a lot of information in a relatively small card area. Security documents often are printed with information such as images of the bearer of the card. Overlaying optically variable indicia over such bearer images can be difficult, however, because many of the optically variable inks are opaque enough to interfere with the visibility of the original (visible) image being overlaid. The relative opacity of many optically variable media means that an indicium (printed with most optically variable media) that is intended to overlay other information might have to have an "open" type of design (such as a design with widely spaced lines, or significant spaces between lines/dots), to permit information overlaid by the indicia to be substantially perceived.

Thus, applying an optically variable media that is opaque to such a card and printing an image with it means that it can be difficult to put other information in that area that was printed/overlaid using the optically variable and still have the non-optically variable information be perceivable to an unaided human eye (for authentication or other purposes).

Another disadvantage of at least some types of optically variable media is that these media can be difficult to apply as part of card personalization (that is, it is often very difficult to print personalized information on a security document using optically variable media).

In one aspect of the invention, we provide methods by which one improves a digital image from which a covert image is formed. One aspect of our invention provides improvements to reduce a "washed-out" effect that can occur when a covert image that has been printed using a covert media such as UV ink, IR ink, thermachromic ink, inks comprising ferrofluids, and the like, is appropriately stimulated so as to cause the covert image to become visible. For example, such washed out effect can be seen when a UV or IR image fluoresces.

One problem that has prevented covert images such as UV or IR images from being "identification quality" is the problem of blurred image details. For example, a problem that can be associated with printing a UV covert image is that since the UV covert image 14 "glows" under appropriate UV stimulation, image details can be less apparent, blurred or can be completely lost. The UV glowing is capable of essentially "washing out" an image's perceptible crispness (e.g., similar to a situation in which a dimly lighted object is in proximity to a brightly lighted object). Similar problems can exist with IR glowing and with thermachromic inks. The inventors of the instant invention have found that image details can be enhanced to overcome this washout problem. In particular, in at least one embodiment of the invention, the inventors have found that it is possible to digitally process an image prior to printing to compensate for the glowing effect.

UV (and/or IR) image glow which washes out the details of a fluorescing UV (and/or IR) image can thus present a considerable problem in relying upon such covert images for identification. To create a discernable fluorescing image on an ID document (useful for identification and security checks), in accordance with one embodiment of the invention, the inventors have found that we can enhance the digital data that is used to create the UV image. Without the inventive enhancements described herein, for example if one simply prints the digital information as such from a digital camera or scanned image, etc., then one may get (when fluorescing) an image that may not as useful for security or identification purposes due to the washed out effect of the UV image. The details of our inventive techniques follow.

In a further embodiment of the invention, steganographic embedded code, such a digital watermark, can be provided in the covert image 14.

In one embodiment, the invention provides a method of processing a digital image that is to be printed on a surface of an identification document as covert image. At least one of edges and boundaries within the image is detected, the detected edges or boundaries forming an intermediate image. The edges or boundaries within the intermediate image are emphasized.

In one embodiment, the invention provides a method of providing a covert image to an identification document. Contrast is increased in at least a portion of the digital image. The contrast-increased portion of the digital image is dithered. The dithered image is transferred to the identification document.

In one embodiment, the invention provides and identification document comprising a core layer and a cover image printed to the core layer. The core layer comprises a core material capable of having printed thereon an image formed using a covert medium. The cover image is formed by providing a digital image that is to be used as a model to generate the covert image, increasing the contrast in the digital image, detecting edges or boundaries within the digital image, the detected edges or boundaries forming an intermediate image, emphasizing the edges or boundaries within the intermediate image, and printing the emphasized intermediate image in a covert medium on the core layer.

We have discovered ways of using optically variable media and ways of printing it to security documents that can provide advantages over the prior art. In one embodiment, the invention relates to identification and security documents, and in particular, relates to various types of optically variable indicia of personalized data formed on such documents. In one embodiment, the optically variable indicium can have a sheen or luster that can appear to be reflective, mirror-like or iridescent. In at least some embodiments, the optically variable indicium is substantially transparent at a first viewing angle (to permit information overlaid by the optically variable indicium to be perceived at least at the first viewing angle), and the optically variable indicium is able to provide a visible, identification quality indicia at a second viewing angle.

We also provide devices and techniques for being able to print indicia that varies from security document to security document (e.g., printing of variable indicia such as bearer images) using such optically variable indicia. The optically variable indicia can be formed anywhere on the document, and in an advantageous embodiment the optically variable indicia is oriented to or disposed in alignment with another variable indicia, such as a substantially identical non-optically variable indicia of the same personalized data.

In one embodiment, the optically variable indicia comprises a variable indicia that overlays (fully or partially) another variable indicia on the card, permitting both indicia to be perceived by an unaided human eye (at different angles of viewing)

In one embodiment, the optically variable indicia is aligned with a variable indicia in a manner permitting the variable indicia to have an appearance that appears to have a sheen or luster or switch from a "positive" image of the indicia to a "negative" image of the indicia, when the identification document is moved from a first viewing angle to a second viewing angle.

For purposes of identification (e.g., of the bearer of an ID document or of the ID document itself), an ID document includes at least one image that is an "identification quality" likeness of the holder such that someone viewing the card can determine with reasonable confidence whether the holder of the card actually is the person whose image is on the card. "Identification quality" images, in at least one embodiment of the invention, include images that, when viewed using the proper facilitator (e.g., an appropriate light source for certain covert images, an appropriate temperature source for thermachromic images, etc.), provide a discernable image that is usable for identification or authentication purposes. To date, however, it has been very difficult to print images such as driver's license portraits with covert (i.e., not visible to an unaided human eye) materials/media such as UV, IR, thermachromic (materials whose appearance changes and/or becomes visible to a naked human eye with temperature), ferrofluids (materials whose appearance changes and/or becomes visible to a naked human eye upon application of a magnetic field) materials, where the quality of the covert image is sufficient to enable the image to be relied upon for identification or authentication. This can be especially difficult when attempting to print color images using covert materials.

In one embodiment, we print the optically variable image of variable data so that it overlays other indicia (fixed or variable) on the identifications document. For example, in an advantageous embodiment we directly align and print an optically variable image of a variable indicium directly over the same non-optically variable indicium that has been printed at that location, so that when the identification document printed in this manner is viewed at a first angle, the variable image of a variable indicium is visible, and when the identification document is viewed at a second angle, the optically variable image becomes visible in the same location. We disclose printing and processing techniques to accomplish this.

In one embodiment, we provide an identification document comprising a document layer and a first indicium. The document layer comprises a material capable of being printed by a thermally transferable optically variable ink. The first indicium is printed on the document layer and comprises personalized data and printed to the document layer by a thermally transferred optically variable ink. The first indicium may be printed to the document layer by disposing a thermally transferable optically variable ink in a mass transfer panel of a printer ribbon adapted for use in a dye diffusion thermal transfer printer, and printing the first indicium as part of a mass transfer printing process. The thermally transferred optically variable ink can be selected and printed such that the first indicium has at least one of a luster, shine, sheen, pearlescent appearance, iridescent appearance, and mirror-like appearance.

The first indicium may comprise a digital image formed by providing an initial digital image that is to be used as a model to generate the optically variable image, the digital image comprising personalized data, increasing the contrast in the digital image, detecting edges or boundaries within the digital image, the detected edges or boundaries forming an intermediate image, and emphasizing the edges or boundaries within the intermediate image.

In one embodiment, the identification document further comprises a second indicium, which can be printed using dye diffusion thermal transfer. The second indicium can be substantially identical to the first indicium, the first and second indicia can be arranged so that at least a portion of one overlays at least a portion of the other.

In one embodiment, the first and second indicia are selected and printed so as to give the appearance of a single image having an appearance that shifts from a positive image to a negative image depending on the angle of viewing.

In one embodiment, we provide a method of printing personalized data to an identification document in an optically variable printing medium. We increase contrast in at least a portion of a digital image, and dither the contrast-increased portion of the digital image. We then thermally transfer the dithered image on an identification document using an optically variable printing medium.

In a further embodiment, we provide a method of printing personalized data to an identification document. We receive a first digitized image, the image comprising personalized data, and a second digitized image that comprises a substantial inverse of the first image. We select a first subset of pixels of the first image as a first printing model and a second subset of pixels of the second image as a second printing model. We print the first printing model to a first location on an identification document using a first printing medium, to a first location on an identification document and print the second printing model to a second location on an identification document using a second printing medium.

The foregoing and other features and advantages of the present invention will be even more readily apparent from the following Detailed Description, which proceeds with reference to the accompanying drawings and the claims.

BRIEF DESCRIPTION OF THE DRAWINGS

The advantages, features, and aspects of embodiments of the invention will be more fully understood in conjunction with the following detailed description and accompanying drawings, wherein:

FIG. 5A is a photographic image including a headshot of a human subject;

FIG. 5B illustrates the image of FIG. 5A with its contrast improved;

FIG. 5C emphasizes the horizontal edges of the FIG. 5B image;

FIG. 5D emphasizes the vertical edges of the FIG. 5B image;

FIG. 5E illustrates a composite image of FIGS. 5C and 5D;

FIG. 5F illustrates a binaryized version of FIG. 5E;

FIG. 5G illustrates an inverted version of FIG. 5F;

Figure 1:
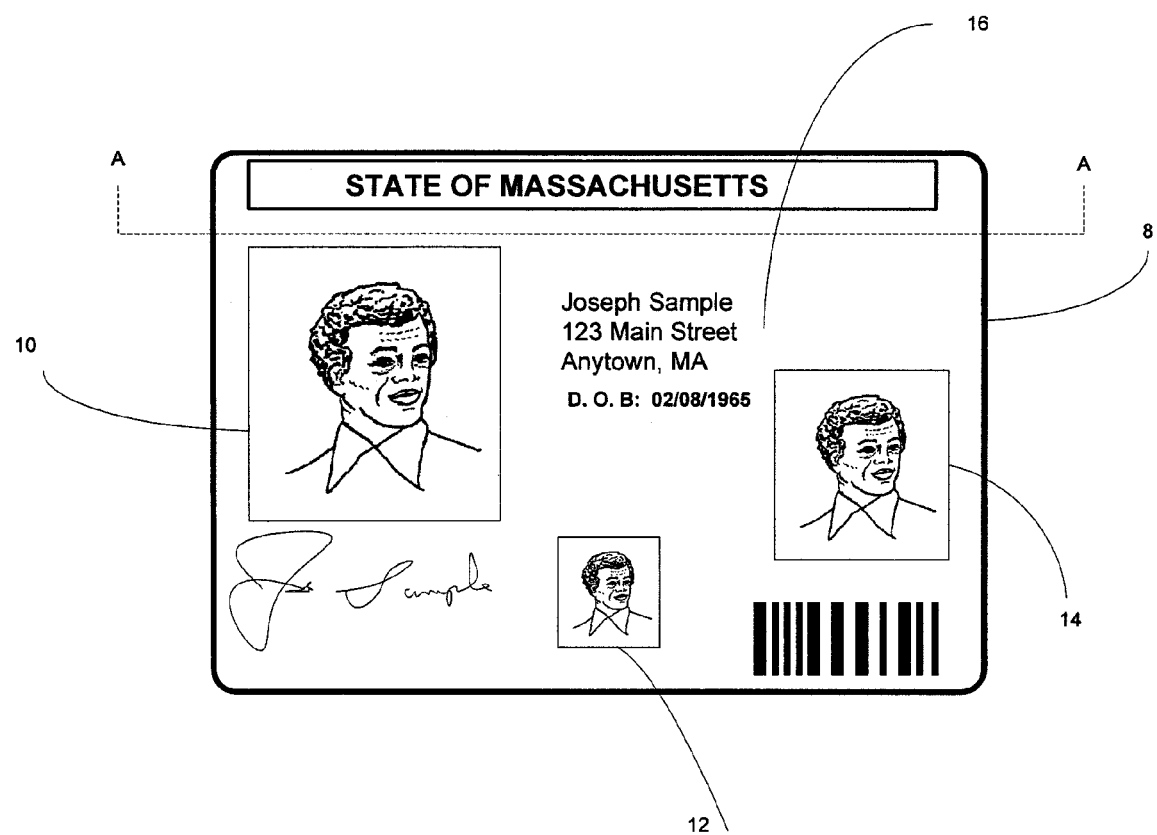
FIG. 1 is an illustration of an identification document.

Of course, the drawings are not necessarily drawn to scale, with emphasis rather being placed upon illustrating the principles of the invention. Relative dimensions of identification documents, laminate layers, indicia, etc., are provided for illustrative purposes only and are not limiting. In addition, in the drawings, like reference numbers indicate like elements or steps. Further, throughout this application, certain indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during manufacturing of identification documents.

DETAILED DESCRIPTION

Terminology

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

In addition, in the foregoing discussion, "identification" at least refers to the use of an ID document to provide identification and/or authentication of a user and/or the ID document itself. For example, in a conventional driver's license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one embodiment of the invention, include covert images that, when viewed using the proper facilitator (e.g., an appropriate light or temperature source), provide a discernable image that is usable for identification or authentication purposes.

There are a number of reasons why an image or information on an ID document might not qualify as an "identification quality" image. Images that are not "identification quality" may be too faint, blurry, coarse, small, etc., to be able to be discernable enough to serve an identification purpose. An image that might not be sufficient as an "identification quality" image, at least in some environments, could, for example, be an image that consists of a mere silhouette of a person, or an outline that does not reveal what might be considered essential identification essential (e.g. hair or eye color) of an individual.

Of course, it is appreciated that certain images may be considered to be "identification quality" if the images are machine readable or recognizable, even if such images do not appear to be "identification quality" to a human eye, whether or not the human eye is assisted by a particular piece of equipment, such as a special light source. For example, in at least one embodiment of the invention, an image or data on an ID document can be considered to be "identification quality" if it has embedded in it machine-readable information (such as digital watermarks or steganographic information) that also facilitate identification and/or authentication.

Further, in at least some embodiments, "identification" and "authentication" are intended to include (in addition to the conventional meanings of these words), functions such as recognition, information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including marking of an laminate or over-laminate structure. The term ID document thus is broadly defined herein to include these tags, labels, packaging, cards, etc.

"Personalization", "Personalized data" and "variable" data are used interchangeably herein, and refer at least to data, characters, symbols, codes, graphics, images, and other information or marking, whether human readable or machine readable, that is (or can be) "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments of the invention, personal/variable data can include some fixed data, as well.

For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads. Personalized and/or fixed data is also intended to refer to information that is (or can be) cross-linked to other information on the identification document or to the identification document's issuer. For example, personalized data may include a lot number, inventory control number, manufacturing production number, serial number, digital signature, etc. Such personalized or fixed data can, for example, indicate the lot or batch of material that was used to make the identification document, what operator and/or manufacturing station made the identification document and when, etc. Further details about such personalized data on identification cards are described further in the following commonly assigned patent applications, each of which is incorporated by reference:

"Inventory Management System and Methods for Secure Document Issuance," filed Dec. 15, 2003, and counterpart non-provisional application of the same title by Gyi, Kaylor and Dong, filed on Dec. 15, 2004 (serial number not yet available);

"Uniquely Linking Security Elements in Identification Documents," Ser. No. 60/488,536, filed Jul. 17, 2003, and non-provisional counter part Ser. No. 10/893,149; and "Protection of Identification Documents Using Open Cryptography," Ser. No. 10/734,614, filed Dec. 12, 2003.

The terms "indicium" and indicia as used herein cover not only markings suitable for human reading, but also markings intended for machine reading, and include (but are not limited to) characters, symbols, codes, graphics, images, etc. Especially when intended for machine reading, such an indicium need not be visible to the human eye, but may be in the form of a marking visible only under infra-red, ultra-violet or other non-visible radiation. Thus, in at least some embodiments of the invention, an indicium formed on any layer in an identification document (e.g., the core layer) may be partially or wholly in the form of a marking visible only under non-visible radiation. Markings comprising, for example, a visible "dummy" image superposed over a non-visible "real" image intended to be machine read may also be used.

"Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. Examples of usable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers is not critical, although in some embodiments it may be preferred that the thickness of a laminate layer be about 1-20 mils. Lamination of any laminate layer(s) to any other layer of material (e.g., a core layer) can be accomplished using any conventional lamination process, and such processes are known to those skilled in the production of articles such as identification documents. Of course, the types and structures of the laminates described herein are provided only by way of example, those skilled in the art will appreciated that many different types of laminates are usable in accordance with the invention.

For example, in ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. patents is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, the following description will proceed with reference to ID document structures (e.g., TESLIN-core, multi-layered ID documents) and fused polycarbonate structures. It should be appreciated, however, that the present invention is not so limited. Indeed, as those skilled in the art will appreciate, the inventive techniques can be applied to many other structures formed in many different ways. For example, in at least some embodiments, the invention is usable with virtually any product which is to include the optically variable images described herein, especially articles to which a laminate and/or coating is applied, including articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

In addition, for purposes of illustration, in many examples we will illustrate aspects of the invention using images that are representative of a bearer of an identification document (e.g., a photographic likeness), but the invention is not so limited. Virtually any indicium can be usable as an "image", and wherever we illustrate the invention with an "image" we fully intend to include virtually any type of indicium.

Image Processing

In one aspect of the invention, the inventors have found that different image processing techniques are used to preprocess an original image that is to be printed as a covert and/or optically variable image (using, for example, a covert and/or optically variable media) depending on whether the tonality of image reproduction (e.g., printing process) is bitonal (e.g., two tones such as black and white or a first color and second color) or monochromatic (e.g., shaded image, grayscale, etc.). The inventors also note that other optional factors to consider include the viewing methods used with the image, such as reflectance, transmissive characteristics (e.g., as discussed above with the UV glowing) and tactility.)

For the methods discussed below, assume that an image is in digital form, such as resulting from being digitally captured, e.g., via a digital camera, optical sensor, etc., or through scanning a photograph with a scanner, etc. In at least some embodiments of the invention, we provide methods to refine this captured image to produce an intermediate image, which can be transferred or printed (or used to generate an image to be transferred or printed) to the identification document as covert image 14.

Mass Transfer Images

In one embodiment, the invention provide a method that can be particularly well suited for producing bitonal images (e.g., black and white images), such as produced through mass-transfer thermal printing and Laser Xerography. Generally, in this embodiment, we process a captured image to bring-out or otherwise enhance relevant features found in the captured image. Relevant features of a human face may include the face outline, nose and mouth pattern, ear outline, eye shape, eye location, hairline and shape, etc., or any other feature(s) that have been deemed to be relevant for identification purposes (e.g., particular features used with matching algorithms such as facial recognition algorithms). Once identified, these featured can be "thickened" or otherwise emphasized. The emphasized features can then form a digital version of a covert image, which can be transferred to an identification card.

The following discussion proceeds with reference to the accompanying flow diagrams and Figures and images (FIGS. 5a-5g) that variously correspond to our inventive processes.

FIG. 1 illustrates an identification document (ID) 8 in accordance with one embodiment of the invention, including an image 10 that is visible under normal viewing conditions. The ID document 8 can be formed using a core material such as PVC, TESLIN, or polycarbonate (PC). Image 10 is preferably a color image, but the present invention is not limited to such. The document optionally includes ghost image 12, which can be a screened-back or "Ghost" version of image 10. In at least one embodiment, the ghost can be a color or grayscale halftone version of image 10. Ghost image 12 is also preferably visible under normal viewing conditions. Covert image 14 (which is shown to be visible for illustrative purposes only) preferably corresponds to image 10 and is preferably an image that is not visible under "normal" viewing conditions. Note also that we will discuss further herein and embodiment similar to that of FIG. 1, but in which covert image 14 is instead an optically variable image.

We note that in an alternative embodiment, the identification document 8 need not include all three of the images 10, 12, and 14. For example, in one embodiment, the identification document 8 can only include covert image 14. In another embodiment, the identification document includes both covert image 14 and image 10. (Note that FIG. 1 is illustrated as if covert image 14 is undergoing appropriate stimulation of the covert image (or, if the covert image is an optically variable image, is being held at an angle if printed with optical variable ink), since covert image 14 is illustrated as being visibly perceptible. It should be also appreciated that the present invention encompasses identification documents including more or less features than the illustrated document in FIG. 1. Additional features may include bar codes, magnetic stripes, digital watermarks, signatures and biometric information (e.g., fingerprint, etc.). These features, along with the positioning or embedding of the features, are optional.

In one embodiment of the invention, covert image 14 is an ultraviolet (UV) image, meaning that it glows (e.g., visibly fluoresces or emits radiation) in response to appropriate UV stimulation. (In some implementations, the UV fluoresces in the UV spectrum upon excitation with visible light.). Covert image 14 is generally imperceptible under normal (e.g., non-ultraviolet or non-angle) viewing conditions In one embodiment of the invention, covert image 14 is an infrared (IR) image, meaning that it glows (e.g., visibly fluoresces or emits radiation) in response to appropriate IR stimulation. In one embodiment of the invention, covert image 14 is a thermachromic image, meaning that it becomes visible only when the image (or entire ID document 8) is subject to a predetermined change in temperature, such as by heating or cooling. In one embodiment of the invention, covert image 14 is an optically variable image, meaning that covert image 14 is most visible when viewed at an angle. Various embodiments of this aspect of the invention are described further herein. In one embodiment of the invention, covert image 14 is formed using a material such as a ferrofluid (available from FeroTec of Nashua, N.H.). Ferrofluids are responsive to magnetic fields, and we anticipate that ferrofluids can be used to produce covert images that become visible when an appropriate magnetic field is applied to the ferrofluid.

In one embodiment of the invention, covert image 14 is a combination of any one or more of UV, IR, thermachromic, ferrofluidic, and/or optically variable images. For example, covert image 14 can be both a UV and a thermachromic image by printing the card area, using the methods described herein, with both UV and thermachromic inks, meaning that when subject to appropriate stimulation, the normally "blank" area of the card will display either a UV image (if appropriate UV stimulation is provided) or a thermachromic image (if appropriate temperature is provided). Those skilled in the art will appreciate that many combinations are possible. It is even envisioned that combination type inks, such as UV thermachromic inks (meaning inks that, to display an image, require both UV and appropriate temperature), the methods described herein will be usable with such inks.

Figure 2:
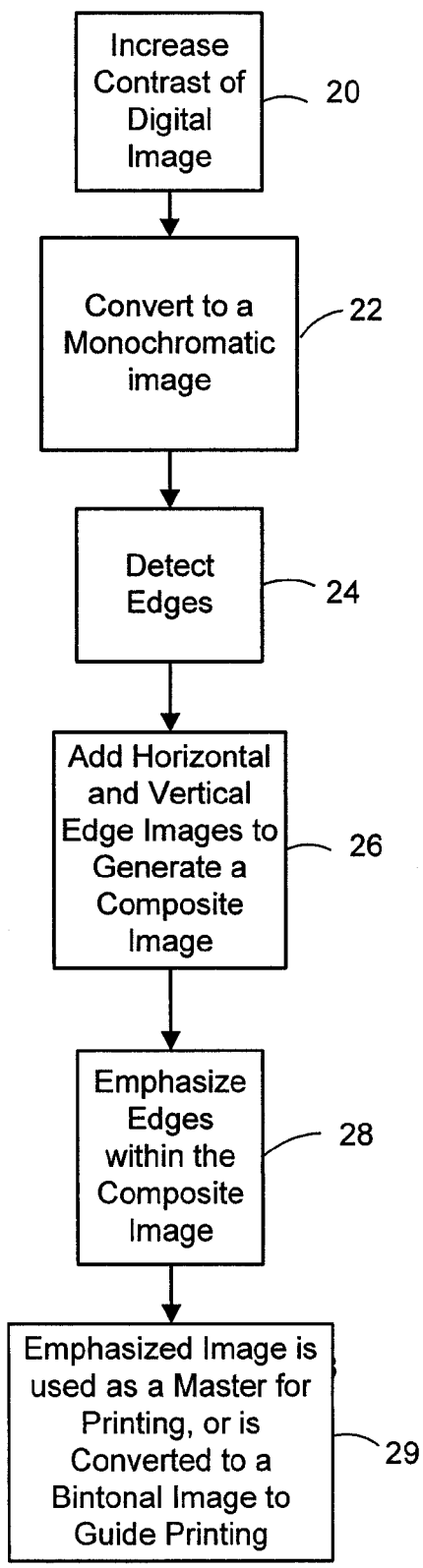
FIG. 2 is a flow diagram outlining a first aspect of the invention.
Figure 5A:
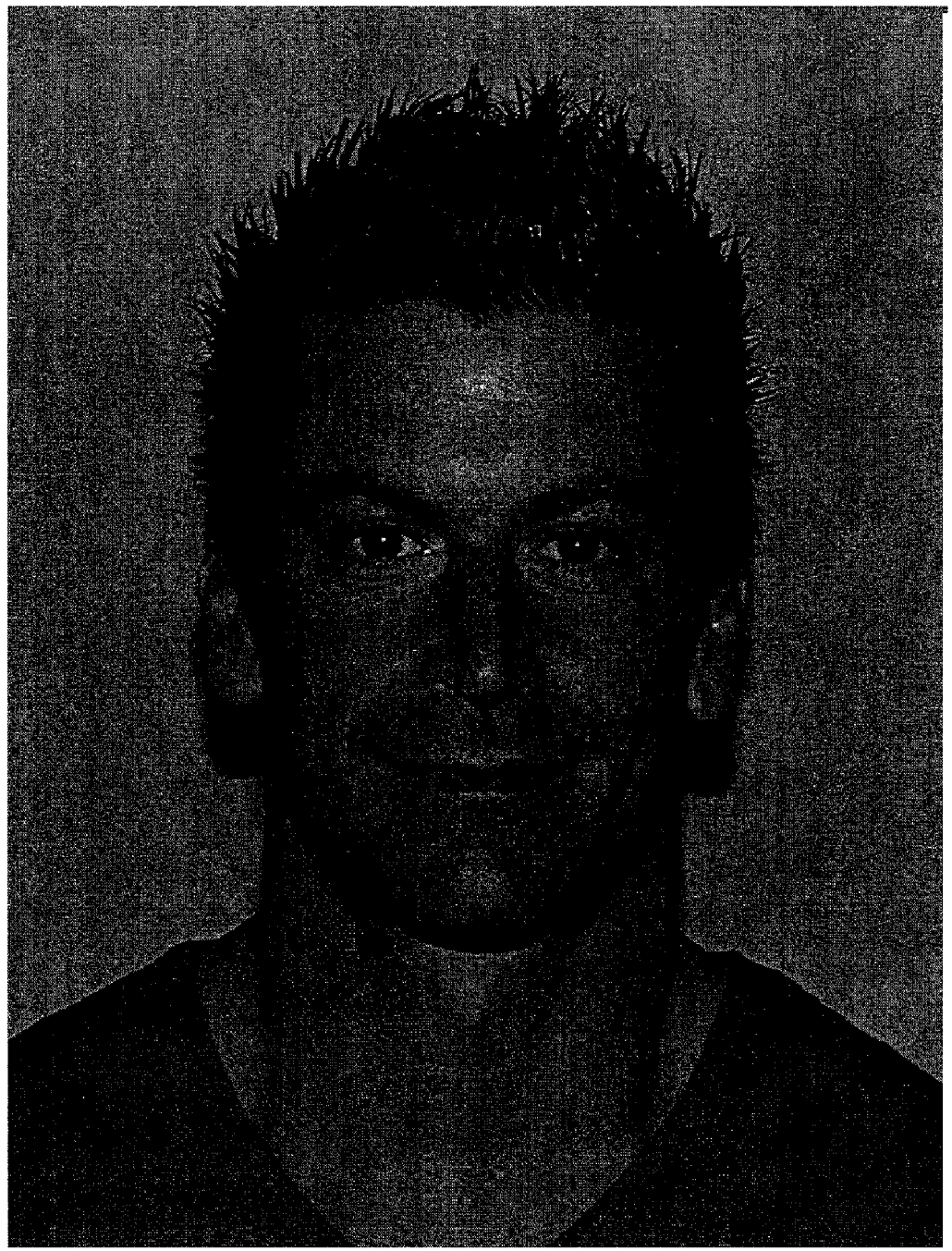
FIGS. 5A-5G are exemplary images illustrating an inventive aspect of the present invention) and in particular.

FIG. 2 illustrates a first implementation of a method to emphasize particular image features, in accordance with one embodiment of the invention. As an initial step, we can improve the contrast in a captured image (step 20). For example, FIG. 5a illustrates such a captured image—a headshot corresponding to a human subject—while FIG. 5b corresponds to a contrast improved version of FIG. 5b, after the processing of step 20. For example, step 20 is intended to make dark pixels relatively darker and light pixels relatively lighter so as to increase the contrast of the image. Image processing methods to improve contrast are well known to those skilled in the art and not detailed here.

Figure 5B:
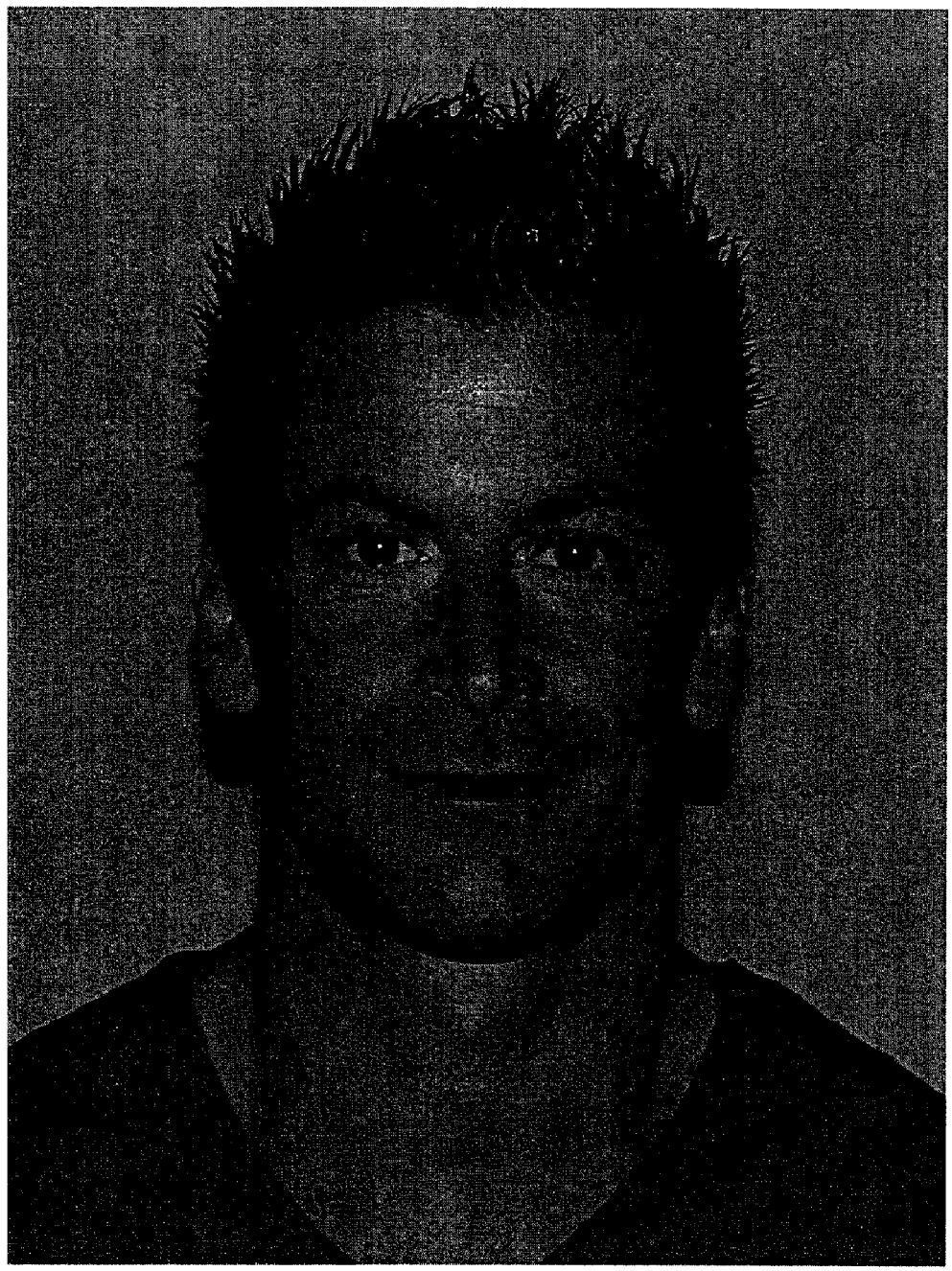
Figure 5C:
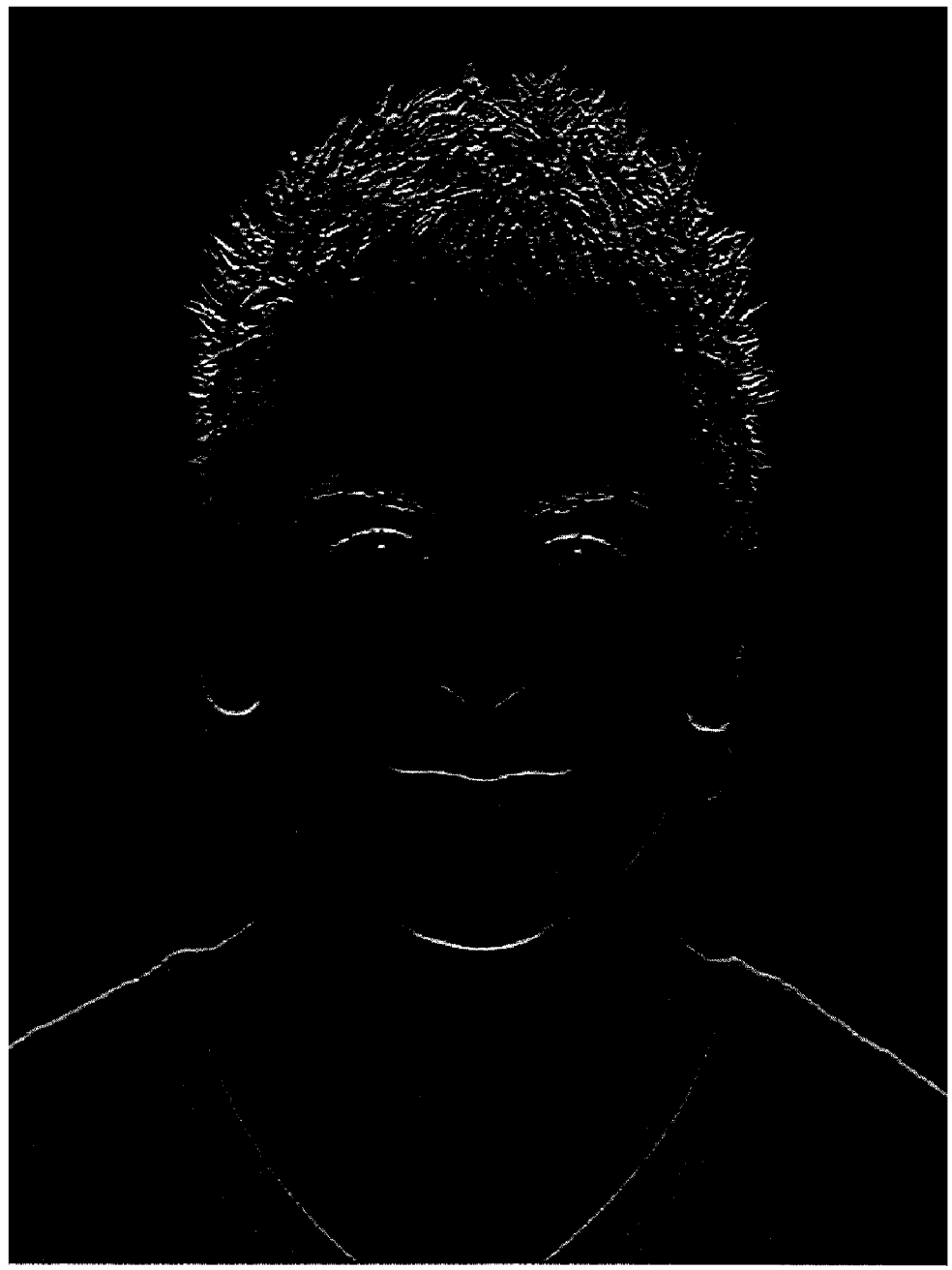
Figure 5D:
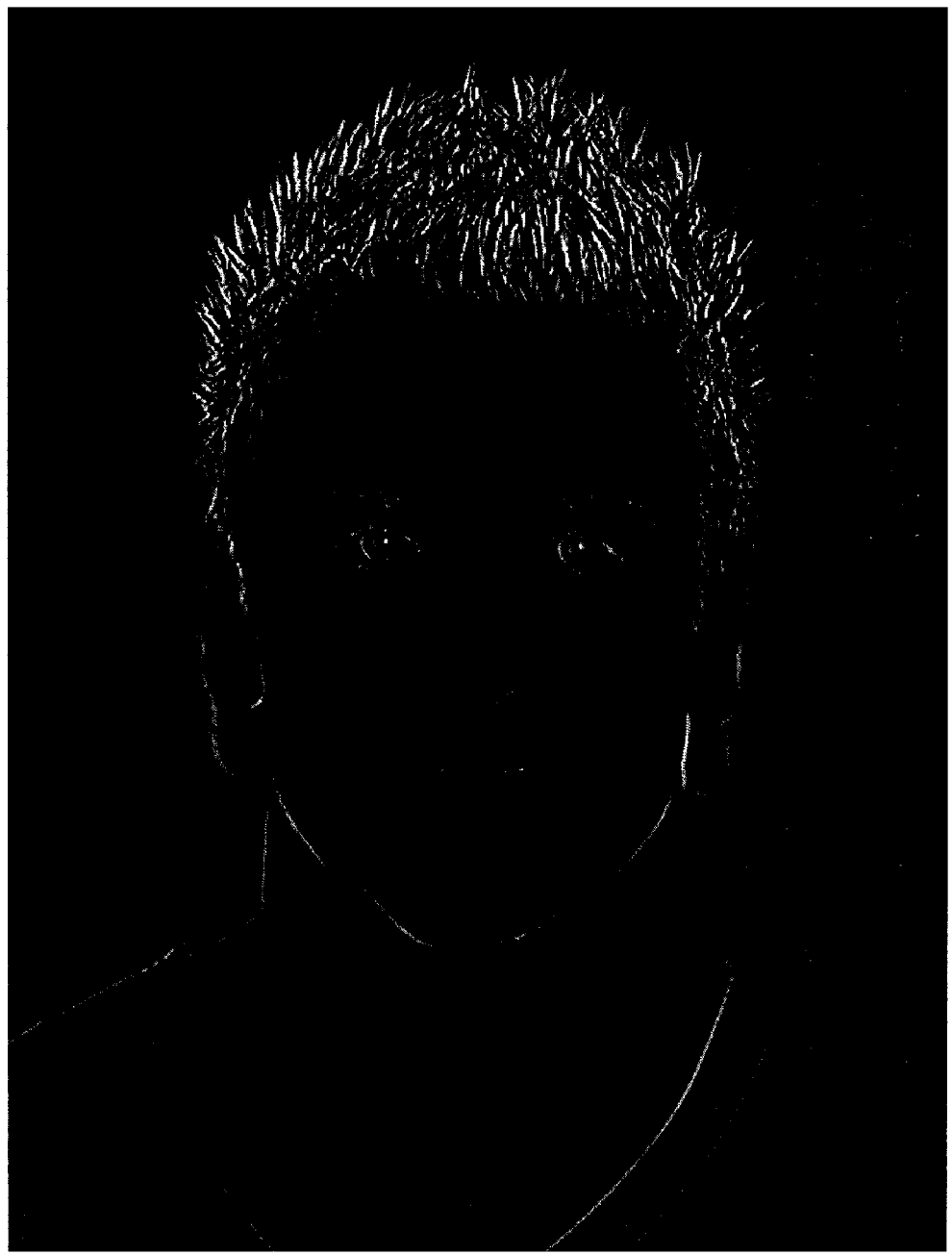

In addition, it should be noted that although FIGS. 5A and 5B are shown as grayscale images, they are actually grayscale renderings of color images. The invention is not limited to color or grayscale images. Indeed, our inventive techniques apply to color, grayscale, monochromatic, optically variable, and black and white images as well. FIG. 5a preferably corresponds to image 10 (FIG. 1). Although not required, step 20 is capable of improving the performance of subsequent steps, such as the edge detection step 24. In some implementations of the invention, as a second step, the contrast-improved image (FIG. 5B) can be converted to a monochromatic image, e.g., a gray-scale image (step 22).

We analyze the contrast-enhanced image to identify or detect edges and/or boundaries within the image in step 24. As noted, eyes, nose and mouth often include prominent edges. Our preferred edge detection algorithm is the Sobel algorithm, however, we note that many other conventional algorithms such as other gradient-based edge detection algorithms (e.g., Roberts, Prewitt), Laplacian (e.g., Morrs-Hildreth) and the Canny edge algorithm can be suitably interchanged with this aspect of the present invention, as will be appreciated by those skilled in the art. Such algorithms are described, for example, in Alan Watt and Fabio Policarpo, *The Computer Image*, (Addison Wesley 1998) at p. 247-249, and also in many U.S. patent documents, such as U.S. Pat. Nos. 6,526,161 and 4,443,438 which are incorporated herein by reference. The results of an edge detector produce an outline-like image, which highlights the edges (or maybe just the significant edges) of the monochromatic image. If using a Sobel algorithm, or another algorithm that produces multiple planes, a horizontal edge plane (FIG. 5C) and a vertical edge plane (FIG. 5D) are produced. These horizontal and vertical planes (or sub-images) can be combined to produce a composite image as in step 26. Of course, step 26 can be skipped if the edge detection algorithm used in step 24 provides a composite horizontal and vertical edge image, instead of separate horizontal and vertical sub-images.

Figure 5E:
Figure 5F:
Figure 5G:
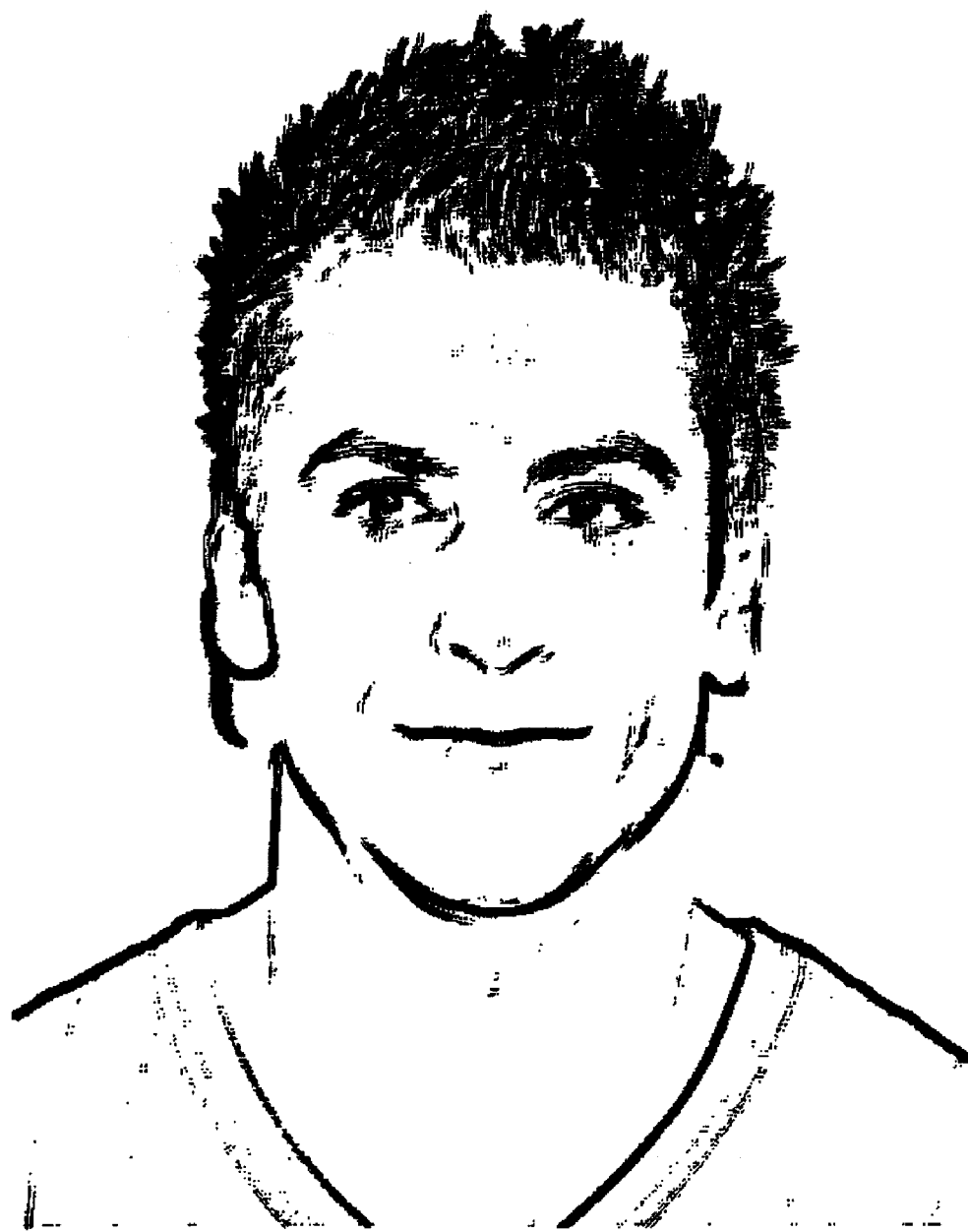

The composite image is then smeared, thickened or otherwise emphasized in step 28 (FIG. 5E). For example, in one embodiment, we can "grow" the edges by a predetermined factor (e.g., 1½-2 times the original edge or line thickness). In one embodiment, we can use an iterative pasting of each sub-image or image plane, multiple times onto a final composite image, but each time offsetting the sub-image by a few pixels (e.g., in a range of 2-5 pixels). In one embodiment, once a composite image is formed, the composite image can be repeatedly copied onto itself, but offset in different directions (toward image corners, or along an X-Y axis, etc.).

In one embodiment of the invention, this thickened image (FIG. 5E) serves as the master (or negative) for guiding printing of a UV covert image 14. In another embodiment of the invention, this thickened image (FIG. 5E) can serve as a master and/or negative for guiding printing of an optically variable image and/or its "negative" (for providing and optically variable mirror effect). In one embodiment of the invention, the thickened image is binaryized or converted to a bitonal image (FIG. 5F) to guide the printing of covert image 14 (step 29). In one embodiment of the invention, the thickened image or bitonal image is first inverted (FIG. 5G), and the inverted image guides the printing of covert (or optically variable) image 14. (So, FIG. 5G could be printed as the optically variable or covert image 14.).

We have found that the method of FIG. 2 can be capable of significantly reducing the washing-out of image details experienced in conventional covert images such as UV, IR, optically variable, or thermachromic images (when fluorescing or otherwise being stimulated).

Figure 3:
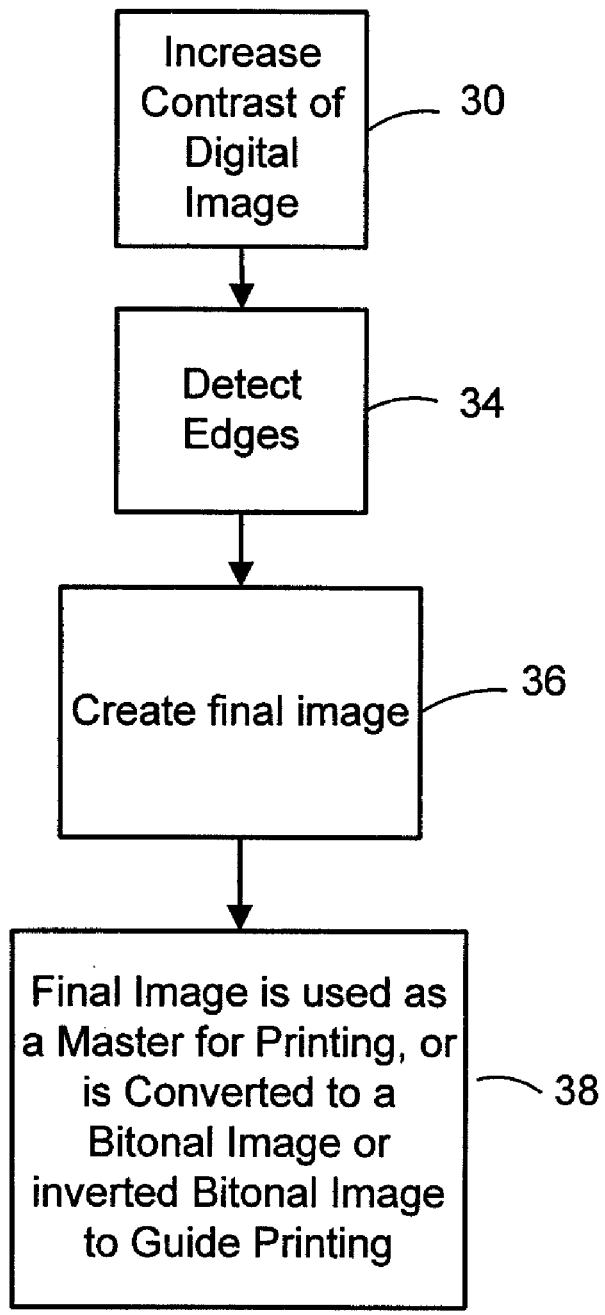
FIG. 3 is a flow diagram outlining a second aspect of the invention.

An alternative implementation of the invention is discussed with reference to FIG. 3. We improve the contrast in a captured image (step 30). Here again, FIG. 5A illustrates such a captured image—a headshot corresponding to a human subject—while FIG. 5B corresponds to a contrast improved version of FIG. 5B. As previously noted, step 30 emphasizes the contrast of an image, e.g., by making dark pixels relatively darker and light pixels relatively lighter (step 30 of FIG. 3 is similar to step 20 of FIG. 2). Our contrast-enhancing step 30 is capable of improving the performance of subsequent steps in FIG. 3, such as the edge detection step 34.

Referring again to FIG. 3, in step 34, we analyze the contrast-enhanced image to identify or detect edges and/or boundaries within the image (step 34 of FIG. 3 is substantially similar to step 24 of FIG. 2). Virtually any edge detection algorithm is usable for step 34. As noted, facial features such as eyes, nose, hair details and mouth often include prominent edges. The results of an edge detector produce an outline-like image, which highlights the edges (or in some implementations just significant edges) of the contrast-enhanced image. If using a Sobel algorithm, or another algorithm that produces multiple planes, a horizontal edge plane (FIG. 5C) and a vertical edge plane (FIG. 5D) are produced. The results of the edge detection are provided to form a composite image (e.g., step 36; FIG. 5E).

The composite image of step 36 is used to guide printing (step 38). In some implementations we convert the composite image into a binaryized or bitonal image (e.g., FIG. 5F). We can also invert a binaryized or bitonal image (e.g., resulting in FIG. 5G) to guide printing. We have found that the method of FIG. 3 method is also capable of reducing the washing-out of image details experienced in conventional covert images (e.g., UV, IR, thermachromic) images and/or optically variable images when the images are appropriately stimulated to become visible (e.g., when fluorescing for UV images) or when held at an appropriate angle for viewing the optically variable image.

Monochromatic

Figure 4:
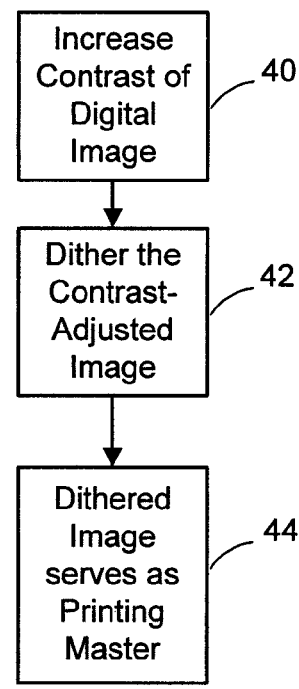
FIG. 4 is a flow diagram outlining a third aspect of the invention.

With reference to FIG. 4, a method for enhancing UV or optically variable images formed through, e.g., D2T2, is described. Note that commonly assigned U.S. patent application entitled "Covert Variable Information on Identification Documents and Methods of Making Same, Ser. No. 10/330, 032 (from which the present application claims priority and published as US Pub. 2003/0173406) describes systems and methods for printing variable covert information using D2T2 printing, and the contents of this patent application are hereby incorporated by reference. Referring to FIG. 4, an originally captured image is processed to increase the contrast in the captured image or in selected areas of the original image (step 40). (In one embodiment, the invention uses an edge-detection algorithm to identify selected areas (e.g., eyes, nose, mouth, face shape, etc.) in the original image, and the contrast in only these selected areas is increased.). We note that care should be taken when using image-adaptive software to avoid removing pixel-intensity information that contributes to the quality of a final image. Dithering (e.g., the Floyd Stein dithering method or other conventional dithering methods (e.g., Floyd Stein, Burkes, Ordered dithering, Stucki, Stephens, Sierra and Jarvis, as are known to those skilled in the art)) of the contrast-adjusted image is employed (step 42) to produce a print-ready image usable as a printing master (step 44). The dithering helps to minimize the effects of UV washout. The dithered image is used as a master for printing a corresponding UV image (step 44). In one embodiment, we invert the dithered image, and then guide printing with the dithered image. As an optional step (not shown in FIG. 4), we scale the contrast-adjusted image to a size that it will be printed, prior to step 42. Those skilled in the art will appreciate that many conventional algorithms and products are usable to scale the contrast-adjusted image to a desired size.

In one embodiment of the invention, we embed a steganographic code into the covert image 14. For example, steganographic code can be embedded into a covert UV image 14. The code can be embedded in the master image, e.g., image 5G. Or the code can be embedded in perceptually significant features, e.g., facial outlines, hair, etc. that are able to survive the processing of FIGS. 2 and 3.

One form of steganographic encoding is digital watermarking. Digital watermarking is a process for modifying physical or electronic media to embed a machine-readable code into the media. The media may be modified such that the embedded code is imperceptible or nearly imperceptible to the user, yet may be detected through an automated detection process. In some embodiments, the identification document includes two or more digital watermarks.

Digital watermarking systems typically have two primary components: an encoder that embeds the digital watermark in a host media signal, and a decoder that detects and reads the embedded digital watermark from a signal suspected of containing a digital watermark (a suspect signal). The encoder embeds a digital watermark by altering the host media signal. The reading component analyzes a suspect signal to detect whether a digital watermark is present. In applications where the digital watermark encodes information, the reader extracts this information from the detected digital watermark. The reading component can be hosted on a wide variety of tethered or wireless reader devices, from conventional PC-connected cameras and computers to fully mobile readers with built-in displays. By imaging a watermarked surface of the card, the watermark's "payload" can be read and decoded by this reader.

Several particular digital watermarking techniques have been developed. The reader is presumed to be familiar with the literature in this field. Some techniques for embedding and detecting imperceptible watermarks in media signals are detailed in the assignee's U.S. Pat. Nos. 6,122,403 and 6,614,914 and PCT patent application PCT/US02/20832, which are each herein incorporated by reference.

Returning to the present implementation, in accordance with this embodiment of the invention, a digital watermark is embedded in the covert image 14. For purposes of illustration, assume that the covert image 14 is a UV image printed in accordance with any of the methods of FIGS. 2 through 4 herein. A watermark detector can only read the covert UV watermark if the host identification document 8 is subject to appropriate UV stimulation at the same time that the host identification document is presented to the watermark detector. This provided additional security to the identification document 8, because even if a counterfeiter is able to access UV inks to print a bogus covert image 14, the bogus covert image 14 will not contain the embedded digital watermark. Of course, mere photocopying or scanning of the identification document 8 will similarly frustrate the counterfeiter, who will be unable to reproduce, through scanning or photocopying, either the covert image 14 or the watermark contained therein.

In one embodiment, the watermark embedded in the covert image 14 may include a payload or message. The message may correspond, e.g., to the ID document number, printed information, issuing authority, biometric information of the bearer, and/or database record, etc. The watermark embedded in the covert image 14 may also include an orientation component, to help resolve image distortion such as rotation, scaling and translation. In at least one embodiment of the invention, we embed two or more watermarks in the OVD image.

In further embodiments, the watermark embedded in the covert image 14 corresponds to information printed on the ID document, or to information carried by a second watermark embedded elsewhere on the ID document (e.g., background pattern, image 10, etc.). More techniques for digital watermarks and ID cards can be found in Digimarc's U.S. Provisional Patent application No. 60/421,254, U.S. patent application Ser. No. 10/094,593, and in U.S. Pat. No. 5,841,886. Each of these patent documents is incorporated herein by reference. We expressly contemplate that the techniques disclosed in this application can be combined with the aspects of the present invention.

Printing and Processing of Images

The inventors have discovered several additional techniques for printing variable indicia onto identification documents, which techniques may be used to improve the security of the identification documents and make the identification documents more difficult to alter and/or counterfeit.

In one aspect, we have found methods for printing an optically variable image of variable data (e.g., data that can differ from card to card) onto the identification document, where the optically variable image has a metallic, iridescent, pearlescent, or "mirror-like" sheen or luster at a particular viewing angle, but which still enables the indicia to be perceived at the particular angle. The optically variable indicia is essentially invisible when the identification document is viewed from angles other than the particular angle. This optically variable image can comprise any type of indicium: images (e.g., a photograph), characters (e.g., a birthdate), graphics, etc. In particular, this optically variable image can comprise personalized data (e.g., data specific to a particular holder of an identification document or specific to a group of identification documents).

In one embodiment of this aspect, we are able print the optically variable image at the time of card personalization using a specially configured ribbon adapted for D2T2 and/or mass transfer printing.

In one embodiment, we print the optically variable image of variable data onto an area of the identification document that contains little or no other indicia, such that when the identification document is viewed at a first angle, the optically variable image is not visible, but when the document is viewed at a second angle, it becomes visible. For example, FIGS. 6A-6B are views of a first embodiment of an identification document 100 in accordance with one embodiment of the invention, shown at first and second viewing image of the bearer 102, fixed information 104 (e.g., state of issuance), bearer signature 106, a fingerprint 108, a visible "ghost" image 110, bar code 112, and security feature 126. In this example, the security feature 126 can be any known type of security feature (e.g., KINEGRAM, hologram, optically variable device (OVD), UV or IR indicia, etc.). The security feature 126 can be a repeating pattern, as shown in FIG. 7.

The security feature 126 can, for example, be applied along with the overlaminate (shown in FIG. 7) to the card, but the method of providing the security feature 126 is not intended to be limiting. One type of security feature 126 usable in at least some embodiments of the invention is described in a commonly assigned co-pending patent application entitled "Use of Pearlescent and Other Pigments to Create Security Document", having Ser. No. 09/969,200, field Oct. 2, 2001. The contents of this patent application are hereby incorporated in their entirety.

Of course, those skilled in the art will appreciate that the identification document of FIG. 6A is merely illustrative and that not all identification documents will necessarily have any or all of the features (e.g., bar code 112, fingerprint 108, security feature 126, etc.) shown in FIG. 1. In an advantageous example, however, the identification document 100 will include at least one variable indicia (such as a bearer image, signature, ghost image, birthdate, etc.) that is visible to an unaided human eye, so that such a variable feature may be compared to the optically variable indicia of variable information described in the following paragraph, to detect counterfeiting and/or alteration.

Figure 15:
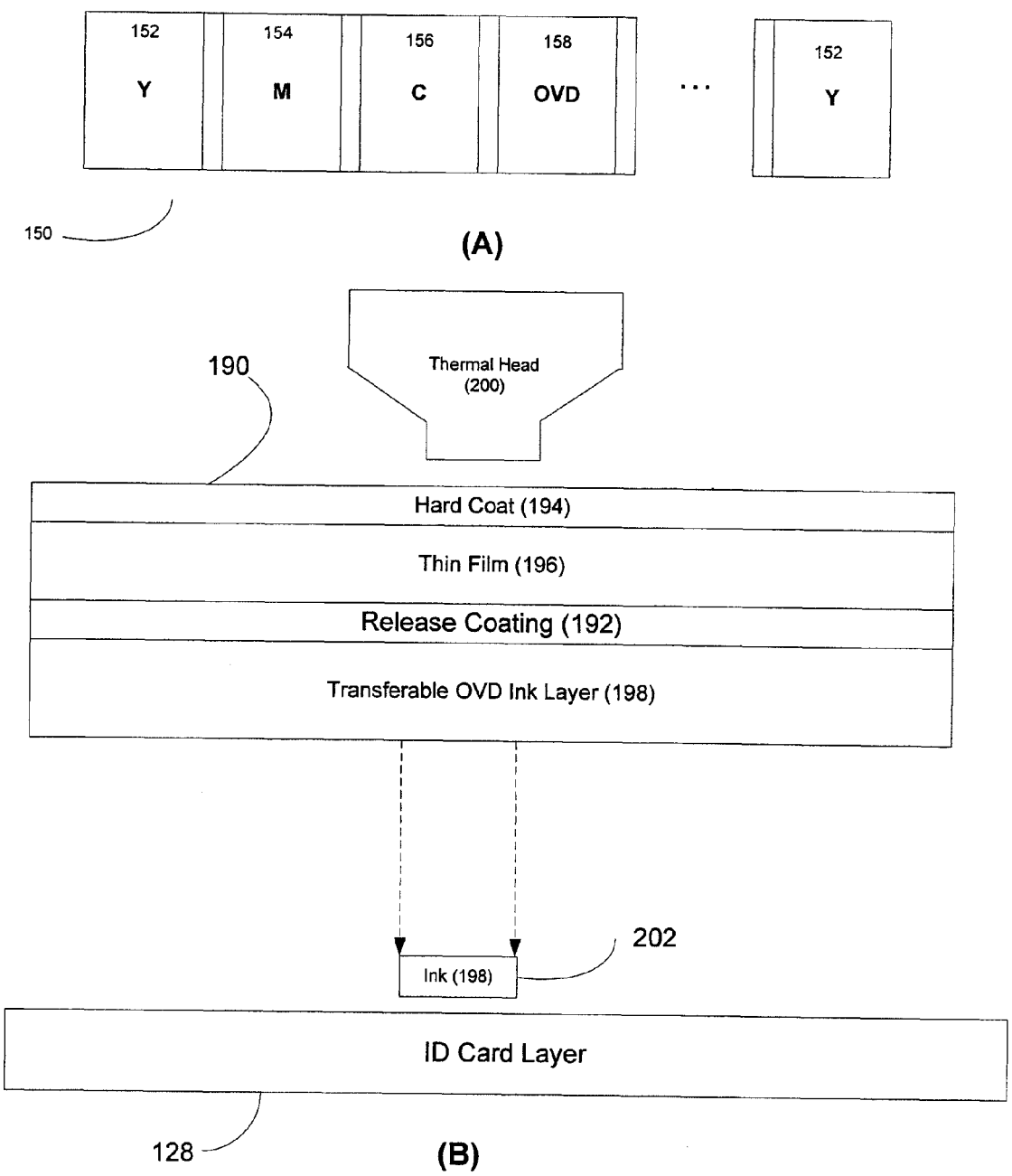
FIG. 15A is an illustration of a first embodiment of a ribbon usable in the manufacture of at least one embodiment of the invention.
FIG. 15B is a cross sectional view illustrating how the ribbon of FIG. 15A may be used for printing onto an ID card layer.
Figure 16:
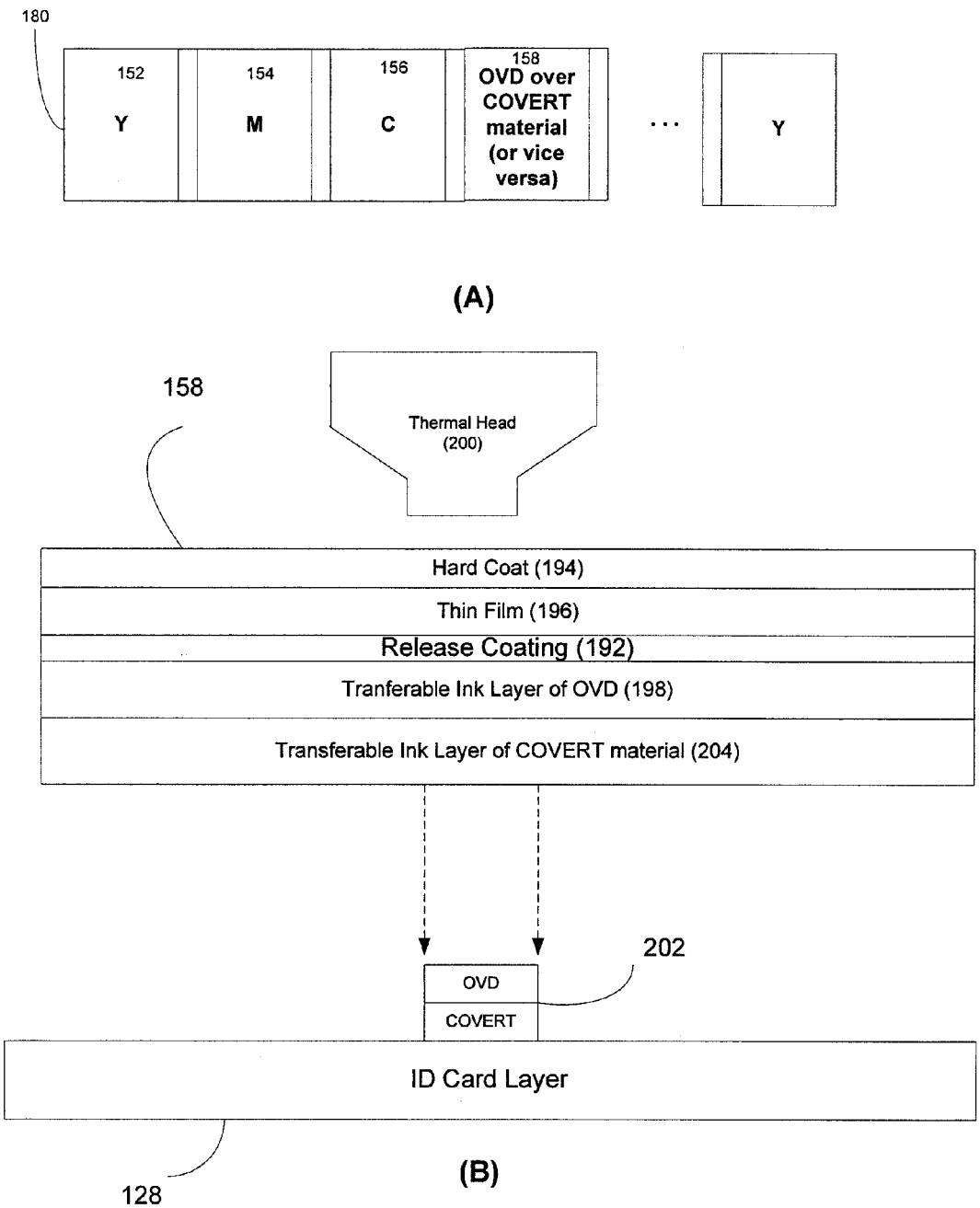
FIG. 16A is an illustration of a second embodiment of a ribbon usable in the manufacture of at least one embodiment of the invention.
FIG. 16B is a cross sectional view illustrating how the ribbon of FIG. 16A may be used for printing onto an ID card layer.
FIG. 16C is an illustration of a third embodiment of a ribbon usable in the manufacture of at least one embodiment of the invention.
FIGS. 16D and 16E are first and second cross sectional views, respectively, illustrating how the ribbon of FIG. 16C may be used for printing onto an ID card layer.
Figure 16:
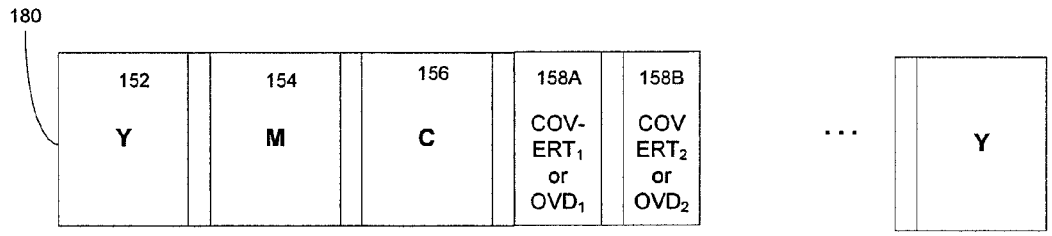
Figure 16:
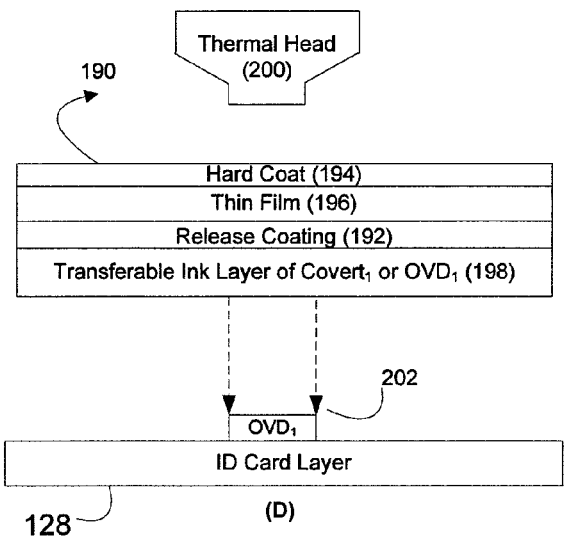
Figure 16:
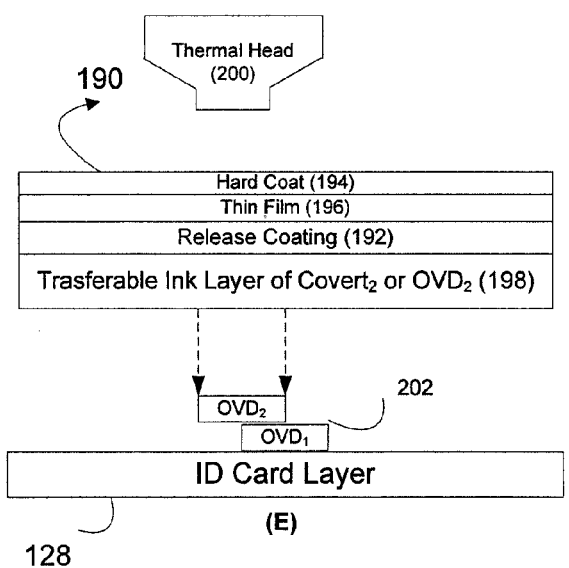
Figure 17:
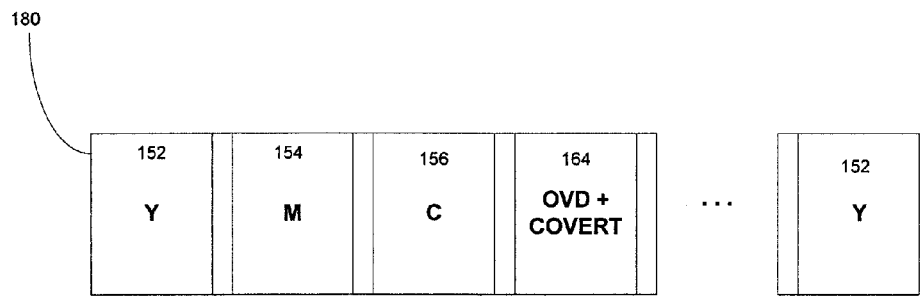
FIG. 17A is an illustration of a fourth embodiment of a ribbon usable in the manufacture of at least one embodiment of the invention.
FIG. 17B is a cross sectional view illustrating how the ribbon of FIG. 17A may be used for printing onto an ID card layer.
FIGS. 17C-17E are illustrations of an identification document printed using the ribbon of FIG. 17A-17B, as shown under various conditions.
Figure 17:
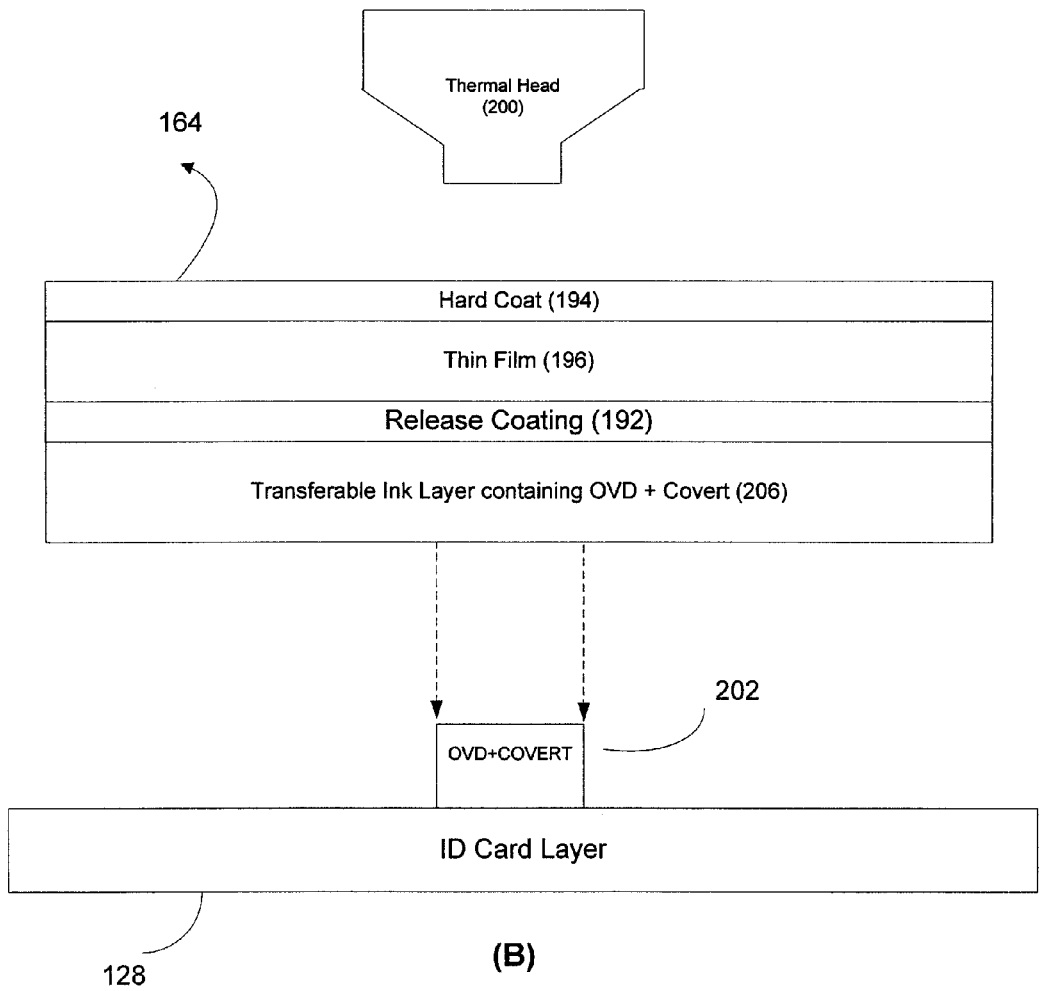
Figure 17:
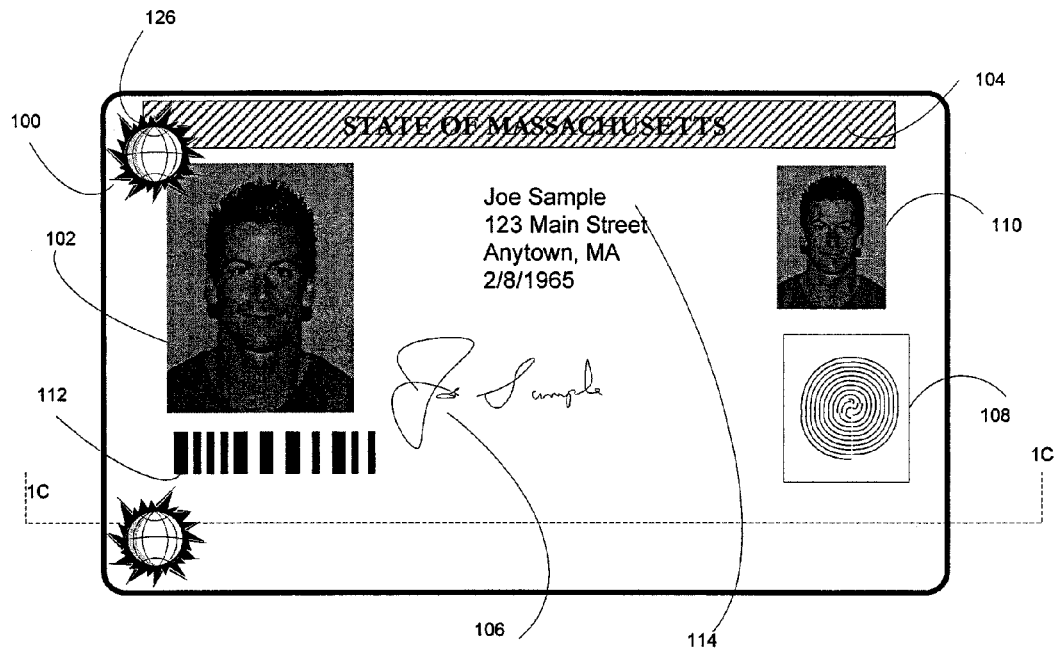
Figure 17:
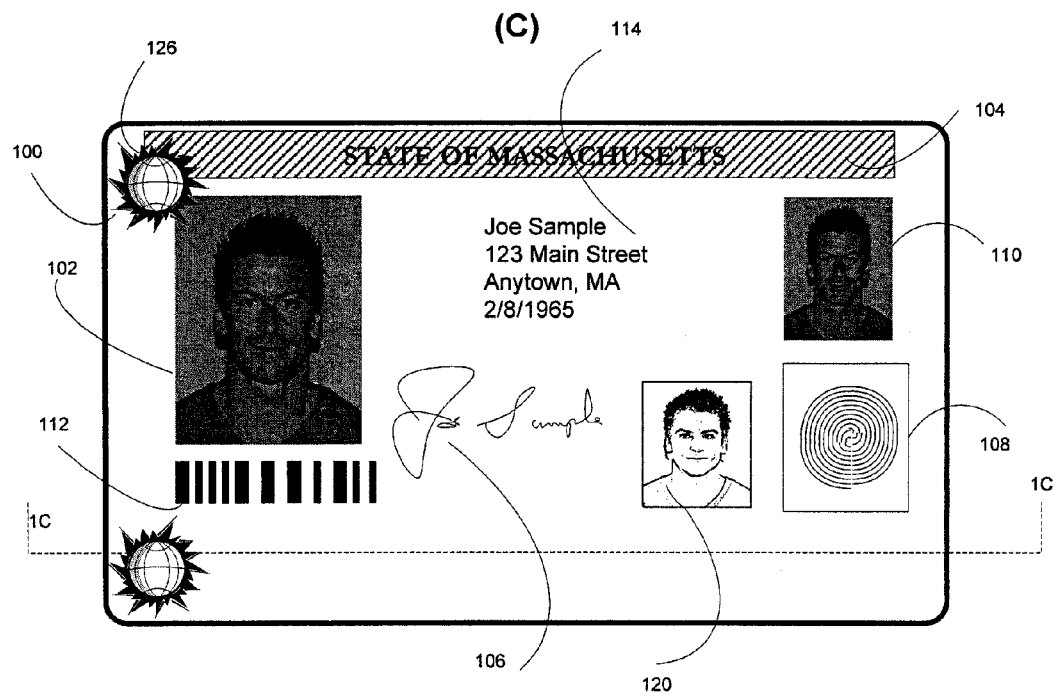
Figure 17:
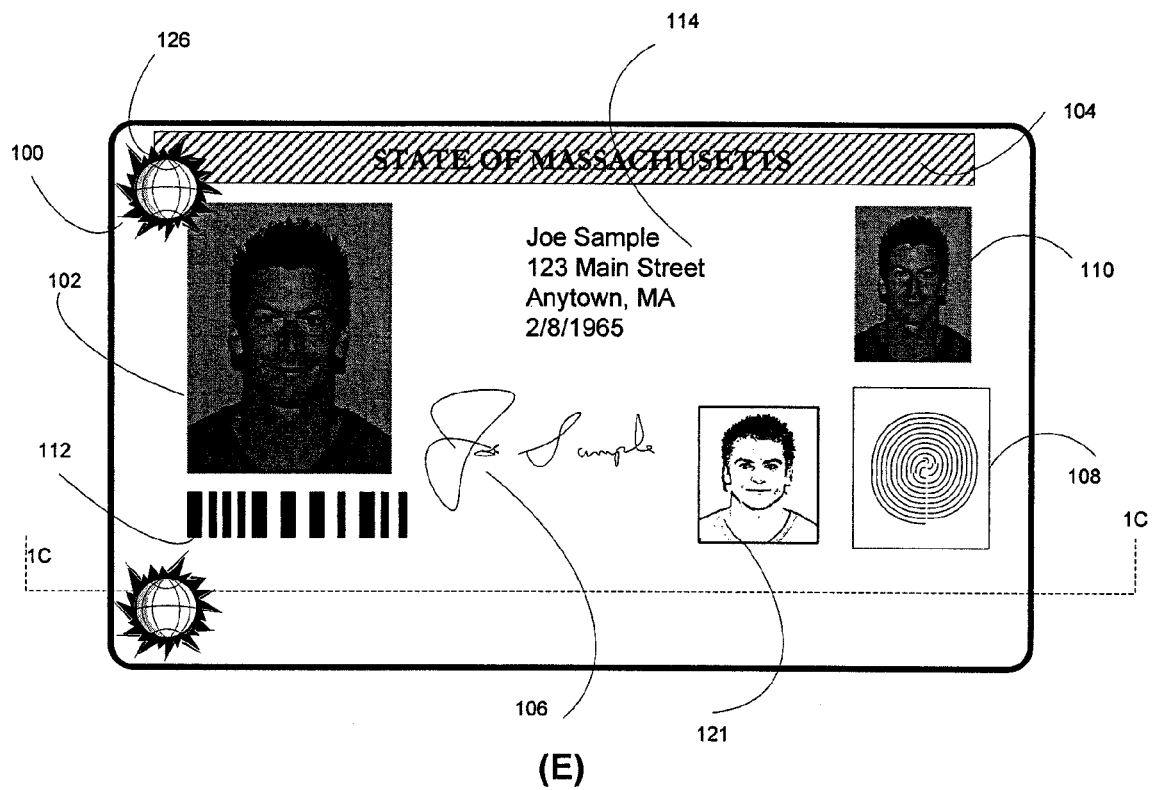

FIG. 6B illustrates the identification document 100 of FIG. 6A shown at an angle which permits the optically variable ghost image 120 and optically variable birthdate 122 to become visible. The use of a ghost image and birthdate in this example are merely illustrative examples of personalized data that can be printed in optically variable ink. One skilled in the art will recognize that other types of variable or personalized indicia, including (but not limited to) biometric indicia, also could be used. In one embodiment, the optically variable ghost image 120 can be applied to the identification document 100 as part of a D2T2 printing personalization process where the printing ribbon includes a thermal transfer panel containing an optically variable ink. Such ribbons are described further herein in connection with FIGS. 15-17.

Referring again to FIG. 6B, although the optically variable ghost image 120 is shown as being smaller in size and in a different place than the visible bearer image 102, the invention is not limited to this implementation. As will be described in FIGS. 4 and 5, the location of the optically variable ghost image 120 can coincide (e.g., can appear to align directly or at least partially) with the respective location of either the visible ghost image 110 and/or the visible bearer image 102. The optically variable ghost image 120 can also have virtually any size, and could even be sized to overlay the entire identification document.

Further, the location of the optically variable ghost image 120 also can coincide with that of non-visible information on the identification document 100, such as information printed using ultraviolet (UV) or infrared (IR) media. The optically variable ghost image also can be on a part of the identification document 100 where there is no other indicia, or where there are only fixed indicia, background patterns, etc.

It also should be noted that although FIG. 6B illustrates that the optically variable ghost image 120 appears to be significantly "darker" than the visible ghost image 110, that is purely for purposes of illustrating a visible difference in appearance between the ghost image 110 and the optically variable ghost image 120. In the embodiment illustrated in FIGS. 6A and 6B, the optically variable ghost image 120 can be printed with an optically variable ink such that the optically variable ghost image 120 appears to be an "inverted" or "negative" version of the ghost image 110 (when the identification document is tilted to the appropriate angle). This action of an image going from a first appearance to a so-called "inverted" or "negative" version of the first appearance is one example (but not the only example) of what we call a "mirror-like optically variable device."

Another example of what we call a "mirror-like optically variable device" appearance at a first angle to a second color or overall appearance at a second angle, where the first image at a first color can be an "inverted" or "negative" version of the second image at the second color. In one embodiment, we have accomplished this type of a "mirror-like optically variable device" by printing a halftone version of a given image in one or more visible colors, then overlaying the halftone image with another halftone version of the same image, but printed using an optically variable ink. In another embodiment, we have accomplished another type of "minor-like optically variable device" by printing a halftone version of a given image in one or more visible colors, then overlaying the halftone image with a version of the same image that has been processed using any one of the methods of FIGS. 2-4 and then printed using an optically variable ink. In still other embodiments, we created additional versions of "mirror-like optically variable devices" by interleaving portions of either two different images or of the same image, where the two interleaved portions are each printed using different media. These embodiments are described further herein.

For example, if an optically variable ink such as one of the inks in Table 1 herein is used, and the image (or other indicium) is printed as described herein, the optically variable image may appear to be a first metallic, iridescent, or pearlescent color at a first angle and will appear to be a either not substantially visible or a different color (e.g., in some embodiments, a second metallic, iridescent, or pearlescent color) at a second angle. As will be further described herein, many other embodiments of the "mirror-like optically variable device" can be created. A few examples of "optically variable minor image" in accordance with various embodiments of our invention include (but are not limited to):

printing a dithered or continuous-tone version of an indicium in an optically variable ink;

printing a dithered or continuous-tone version of an indicium in an optically variable ink directly over and in alignment with the same indicium printed in a non-optically variable ink, wherein the indicium in optically variable ink becomes visible at certain viewing angles and the non-optically variable indicium is not visible at those viewing angles;

printing a first dithered or continuous-tone version of an indicium in an optically variable ink directly over and in alignment with a second indicium (which can be the same indicium) printed using a covert material (e.g., ultraviolet (UV) ink, infrared (IR) ink, thermachromic ink, combinations of UV, IR and/or thermachromic, etc.) and optionally in alignment with a third indicium (which can be an indicium that is the same as either or both of the first and second indicia or which can be a third indicium) printed using a non-covert, non-optically variable material;

printing a first dithered or continuous-tone version of an indicium in a first optically variable ink interleaved with a second dithered or continuous tone version of an indicium in a second optically variable ink, where the first and second dithered versions are different enough that a naked human eye can see a shift in the indicium and/or its color as the viewing angle of the image is shifted;

printing a dithered or continuous-tone version of an indicium using more than one optically variable ink, where a first portion of the pixels in the indicium are printed in a first color of optically variable ink and a second portion of the pixels in the indicium are printed using a second color of optically variable ink, wherein the overall appearance of the indicium printed using the two or more colors of optically variable ink can appear to have a luster or sheen as the indicium is viewed from different viewing angles;

printing a dithered or continuous tone version of an indicium using a plurality of colors of optically variable ink, where the indicium is formed on a portion of the identification document that does not contain other indicia; and/or printing an indicium that includes microtext variable data using an optically variable ink, where the microtext variable data is structured and arranged to appear, to the unassisted human eye, to be an optically variable ornamental or decorative element on the another indicium or on the identification document itself (e.g., a border around an image of an individual, a line (or pattern or lines) disposed near fixed indicia on the identification document, a border or design around another security feature, such as a hologram, etc.).

The above are merely examples, and those skilled in the art will readily appreciate that many additional variations are possible in accordance with the invention.

FIG. 7 is an exploded isometric view of an identification document similar to the first embodiment of FIGS. 6A-6B. In the exploded isometric view, for simplicity of illustration the identification document 100 is shown via three layers: front outer laminate layers 124, back outer laminate layer 125, (each of which, in one embodiment, are overlaminate type layers on the outer surface of the card) and an inner document layer 128 which, as FIG. 8 illustrates, can comprise more than one layer. In addition, for purposes of illustration, the optically variable ghost image 120 and optically variable birthdate 122 are shown as being "visible" (and having a similar appearance) so that the reader can see that they are disposed between the "front" side of inner document layer 128 and the outer laminate layer 124. Although not illustrated in the embodiment of FIG. 7, it will be appreciated that optically variable indicia also can be disposed between outer back laminate layer 125 and the "back" side of inner document layer 128.

FIG. 8 is a cross-sectional view of the identification document 100 of FIGS. 6A-6B and FIG. 7, taken along the 6C-6C line of FIG. 1, in accordance with one embodiment of the invention. The particular structure shown in FIG. 8 is an example of just one type of identification document that can be used to produce the identification document 100 of FIGS. 6A-6B. In one embodiment, the structure shown in FIG. 8 is based on and adapted from the identification documents shown and described in commonly assigned U.S. Pat. No. 6,066,594, the contents of which are hereby incorporated by reference in their entirety. In one embodiment, the structure shown in FIG. 8 is based on and adapted from the identification documents shown and described in commonly assigned U.S. Patent Application Ser. No. 60/471,429 and Ser. No. 10/848,526, the contents of which are hereby incorporated by reference in their entirety.

Referring again to FIGS. 6A, 6B, 7, and 8, the identification document 100 includes a core layer 130, onto which fixed indicia 104 are printed (or pre-printed). The core layer in at least some embodiments is formed using a material adapted to be printable or markable (e.g., by laser marking) using a desired printing/marking technology. Materials that are printable can include, as an example, materials such as polyolefin, silica-filled polyolefin, TESLIN (available from PPG Industries, Inc.), polyester, or polycarbonate, PVC, paper, foamed polypropylene film (including calcium carbonate foamed polypropylene film), plastic, polyolefin, polyethylenetelphthalate (PET), PET-G, PET-F, and combinations thereof. Many other materials are, of course, usable, as those skilled in the art will appreciate. In an advantageous embodiment, the core 130 is substantially opaque, which can enable printing on one side to be not viewable from the other side, but opacity is not required. In some embodiments, it may, in fact, be advantageous that the core 130 be substantially transparent. The color of the core 130 does not matter, but in an advantageous embodiment the core 130 is colored to provide a good contrast with indicia printed (or otherwise formed) thereon. For example, the core 130 can be light colored to provide a good contrast with dark indicia, or dark colored to provide a good contrast with light indicia.

A layer of substantially transparent laminate 134 is coupled to the core 130. In the illustrated embodiment, the transparent laminate 134 is coupled to both sides of the core 130, but that is not essential, as laminate may be coupled to just one side. Note also that, in some embodiments (e.g., laser engraving embodiments, described further herein), the transparent laminate 134 may not be needed at all. Many different materials are usable for the laminate, as described previously. In one embodiment, a layer of adhesive 132 is used to affix the laminate 134 to the core 130. Other methods of affixing the laminate 134 to the core 130 are usable. For example, if the core 130 and the laminate 134 are made of substantially the same material (e.g., polycarbonate), the core 130 and laminate 134 can be laminated together into a single structure, as is well understood by those skilled in the art. Similarly, if a laminate 134 and an overlaminate 124 are both made of the same material (e.g., polycarbonate), they can be laminated into a single structure.

If the laminate 134 is made of a material (e.g., PET) that is not itself capable of being imaged using a given printing or marking technology (e.g., D2T2), layers or coatings may be applied to the laminate 134 to make it printable and/or markable. For example, in one embodiment, the laminate 134 can be coated with a coating that enhances absorption of laser energy (such as that described in commonly assigned patent application Ser. No. 10/326,886 (published as U.S. Pub. 2003-0234286), entitled "Laser Engraving Methods and Compositions, and Articles Having Laser Engraving Thereon," which is hereby incorporated by reference). In another example, an image receiving layer 119 that improves D2T2 printing can be applied to the laminate 134. Illustrative examples of usable image receiving layers are described in the commonly assigned U.S. Pat. No. 6,066,594, which was incorporated by reference above. Variable data 131 (e.g., signature 106, ghost image 110, fingerprint 108, etc.) is printed to the image receiving layer 119, such as by D2T2 and/or mass transfer printing and/or laser engraving. The combination of core layer 130, adhesive 132, fixed indicia 104, laminate 134, image receiving layer 119 and variable data 131 correspond to the inner document layer 128 of FIG. 7. The optically variable indicia of variable data 136A-136C, such as the ghost 120 and/or birthdate 122 of FIG. 7, are printed on this layer.

In one implementation of this embodiment, the optically variable indicia of variable data 136 (hereinafter "OVVD 136") is formed on the laminate 134 by printing the laminate with a conventional D2T2 YMC type of ribbon modified, as mentioned previously, by the addition of a panel containing a thermally transferable thermally transferable optically variable pigment, such as ink or dye. The composition of this optically variable pigment is described further below.

Figure 10:
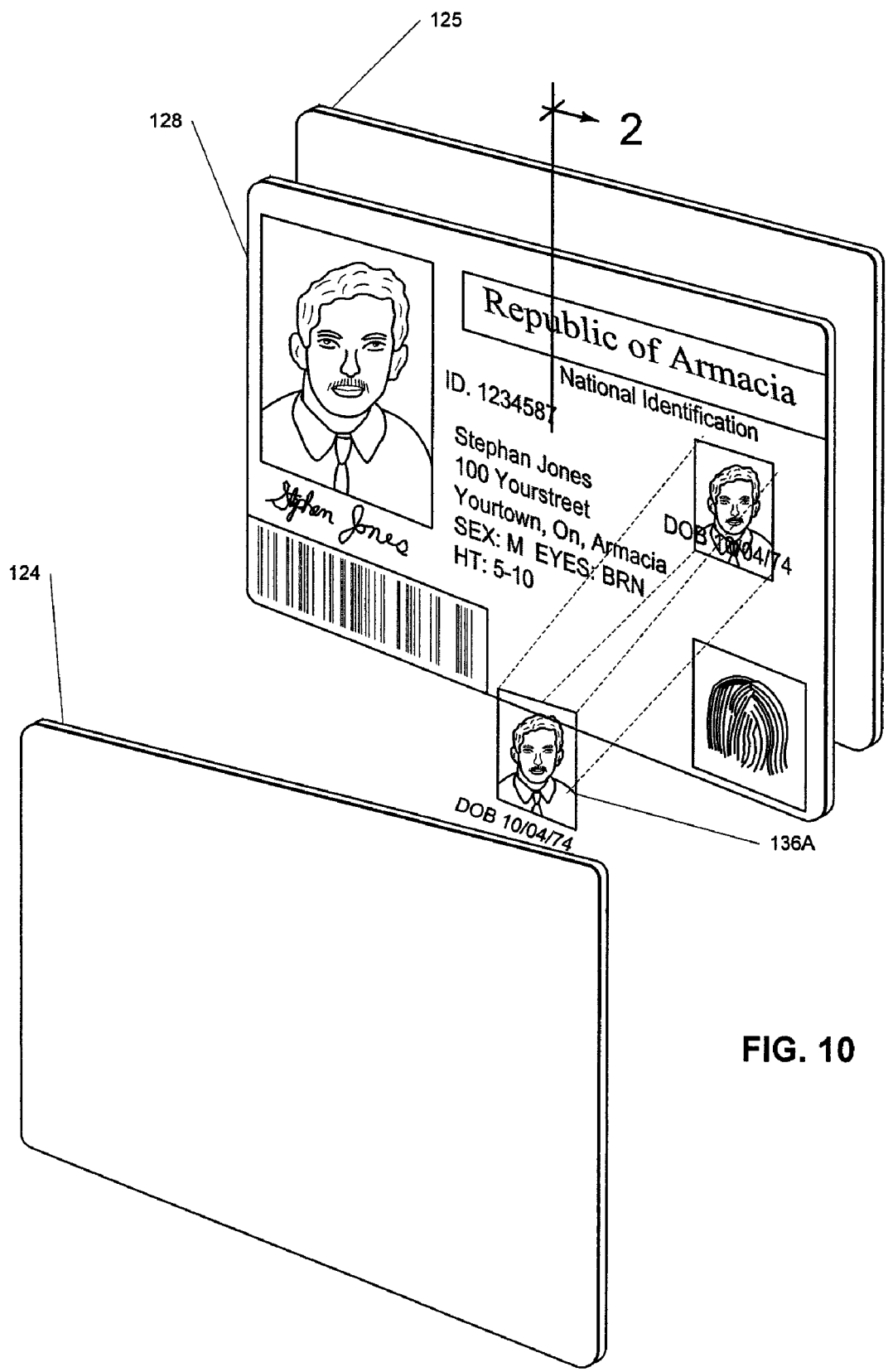
FIG. 10 is an exploded isometric view of an identification document illustrative of the third embodiment shown in FIGS. 9A-9B.

FIG. 15A is an illustrative example of a first YMC ribbon 150 that we have developed that can be used to make an ID document with an OVVD 136, in accordance with one embodiment of the invention. Referring to FIG. 10, the YMC ribbon 150 comprises a plurality of color panels, including a yellow color panel 152, a magenta color panel 154, a cyan color panel 156, and an optically variable color panel 158. Each color panel 152-156 can be coated with a colorant such as a diffuseable dye in a resin. The optically variable panel contains a thermally transferable optically variable dye, such as a color shifting dye. Such dyes are known to those skilled in the art. Examples of dyes usable in accordance with the invention include many different types of inks, including but not limited to color shifting inks, security inks, pearlescent inks, (such as the ink disclosed in our commonly assigned patent entitled "Use of Pearlescent and Other Pigments to Create Security Documents", Ser. No. 09/969,200 (now U.S. Pat. No. 6,827,277), which is incorporated by reference herein), photoactive materials, etc. In one embodiment, we have determined that several different formulations of ink can each be used as the optically variable ink of the present invention. These formulations are shown in Table 1:

TABLE 1

| Color | Gold | Blue | Silver | Green/UV |
|---|---|---|---|---|
| Solvent | | | | |
| Ethyl Acetate | 32.5% | 31.25% | 10% | 30.7% |
| n-Propyl Acetate | 30.5% | 31.25% | 48% | 30.7% |
| n-Butyl Acetate | | | 10% | |
| Binders | | | | |
| Bostik 2700B LMW | 19.0% | 19.50% | 19% | 18.6% |
| Pigments | | | | |
| Flamenco Gold216C | 18.0% | | | |
| Afflair 7225 | | 18% | | |
| Afflair 103 | | | 13% | |
| Afflair 7235 | | | | 17.5% |
| Cartax | | | | 2.5% |
| Total Solid % | 37.0% | 38% | 32% | 38.6% |

Referring to Table 1, it can be seen, for example, that an illustrative formulation of optically variable ink includes about 60-70% solvent, 15-20% binder, and 10-20% of a pigment having optically variable properties (e.g., a pearlescent material). Of course, these ranges are not limiting. Further, depending on how opaque or translucent one wants a given OVDD 136 to be, the concentration of pigment can increase or decrease. In addition, the particular formulations of Table 1 (including particular brands of Binder and/or Pigment used) are provided by way of example only. For the formulations similar to those described in Table 1, pigments, binders, and solvents can be obtained from many different sources, as those skilled in the art will appreciate. For example, suitable ink materials and pearlescent pigments are available from, e.g., Mearl (now Engelhard) (e.g., under the trade names Flamenco, Mearlite, ReFlecks, etc.) of Iselin, N.J. and EM Industries/EMD Chemicals of Gibbstown, N.J. (e.g., under the trade name Afflair, etc.); CARTAX pigments are available from Clariant Corporation of Charlotte, N.C., and BOSTIK binders are available from Bostick-Findley, Inc., of Middleton, Mass. Of course there are many other pigments and materials that may be suitable interchanged with this aspect of the present invention.

In accordance with this embodiment of the invention, the OVVD 136 of FIGS. 8 and 10-14 can be printed on the ID document 100 at substantially the same time that the other variable indicia 131 are printed. Advantageously, as shown in FIGS. 1-3, in one embodiment, the OVVD 136 can be printed, sized, and aligned so that it appears to directly overlay a corresponding variable indicium 131. The OVDD 136 can, in one embodiment, be directly printed over (in a pixel for pixel match) a corresponding variable indicium 131. In another embodiment, the OVDD 136 image can be interlaced with the variable indicia 131, such that the OVDD 135 and the variable indicium 131 appear to be located in the same spot (this is described further herein).

Figure 6:
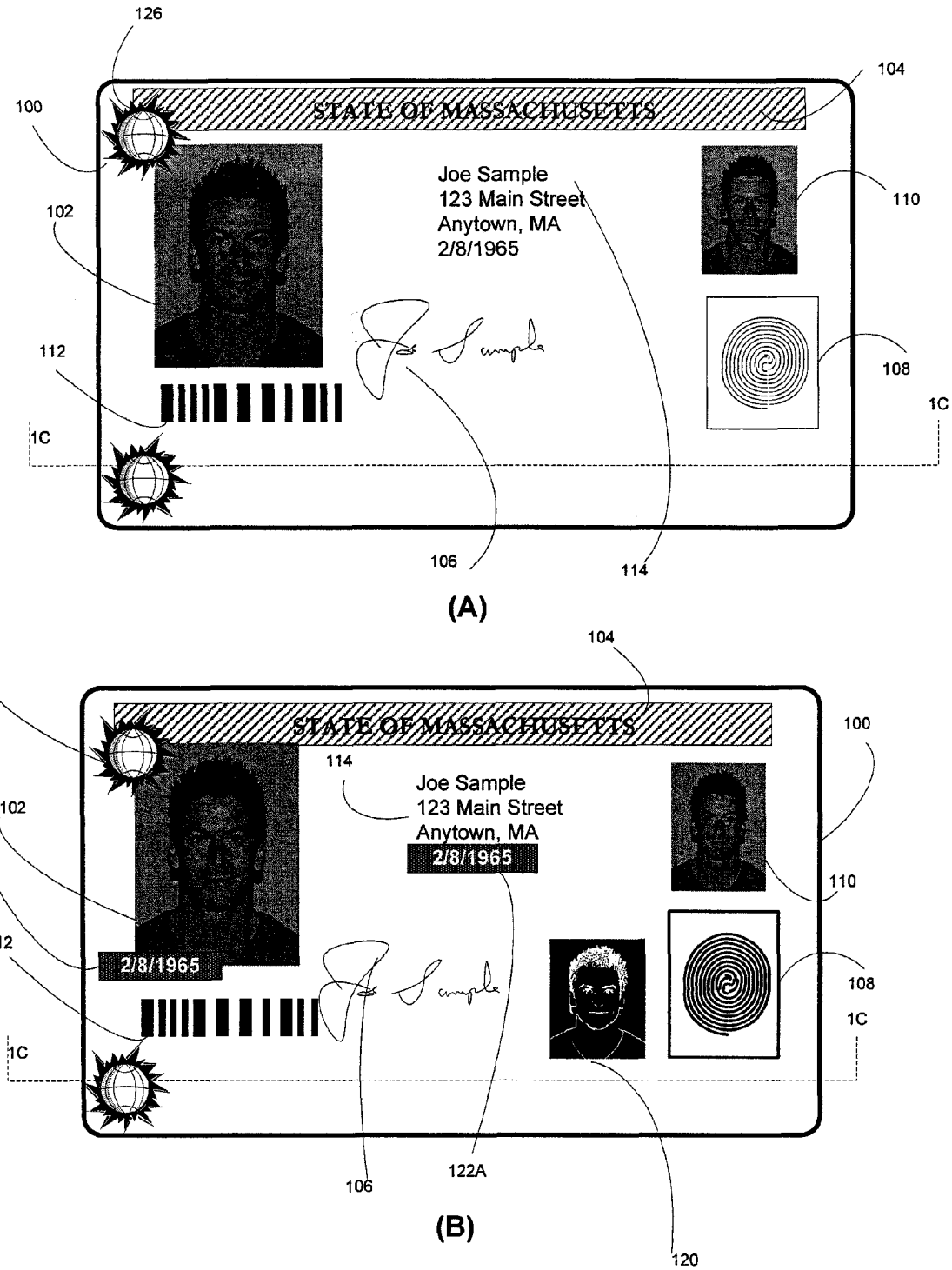
FIGS. 6A-6B are views of a first embodiment of an identification document in accordance with one embodiment of the invention, shown at first and second viewing angles, respectively.
FIGS. 6C-6D are views of a second embodiment of an identification document in accordance with one embodiment of the invention, shown at first and second viewing angles, respectively.
Figure 6:
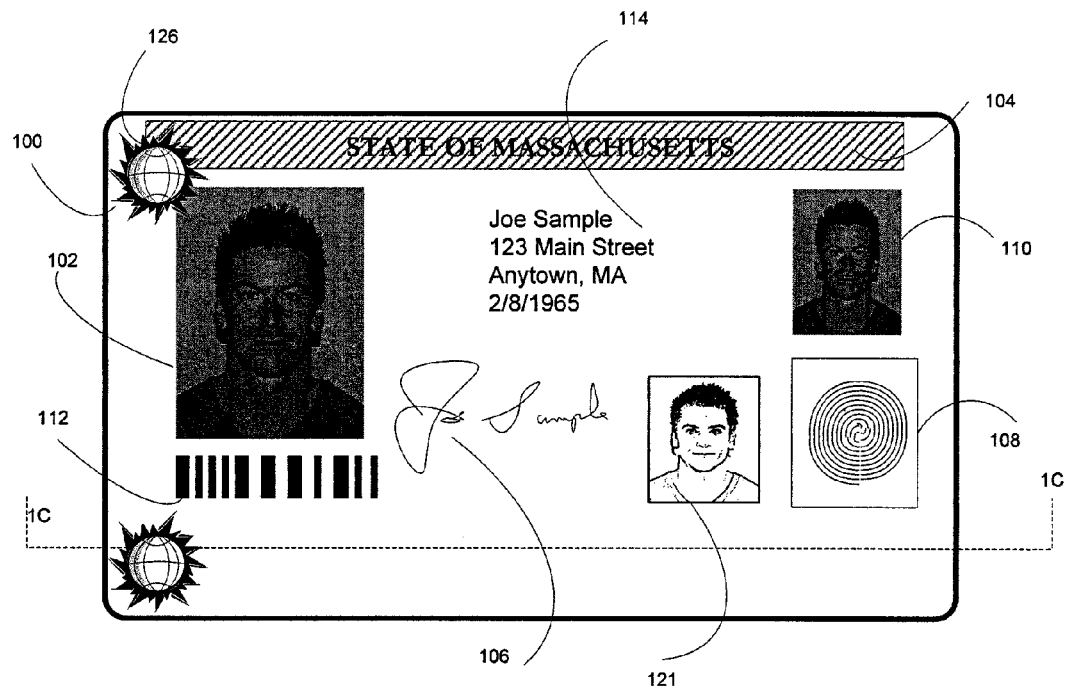
Figure 6:
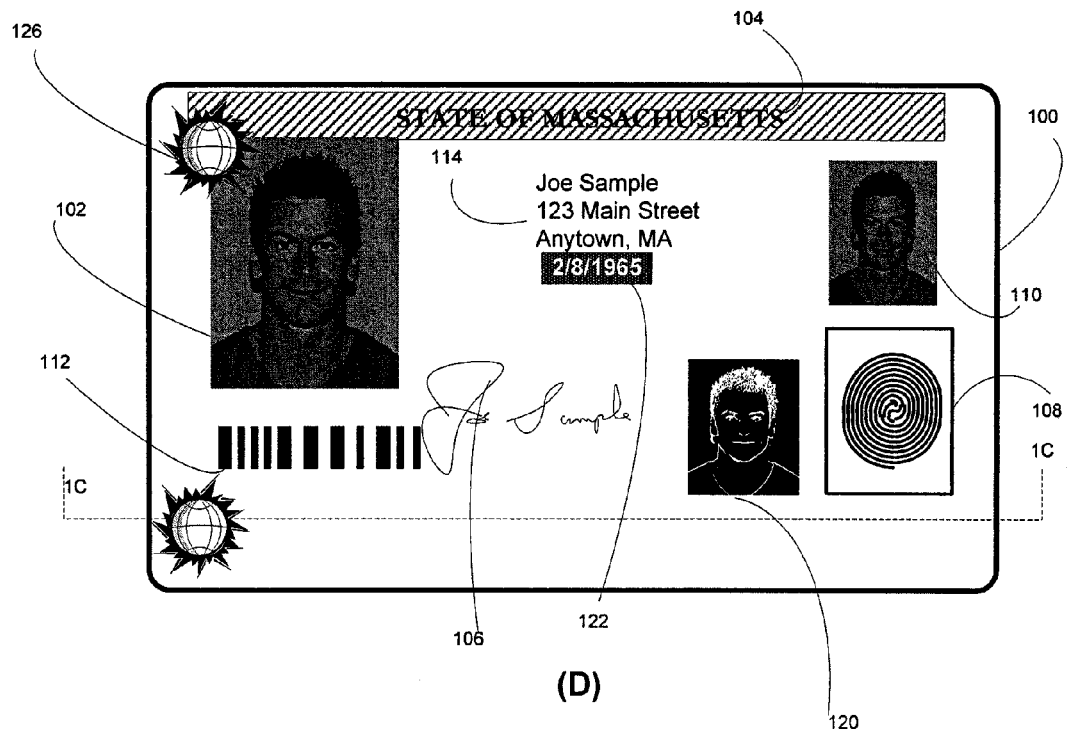
Figure 7:
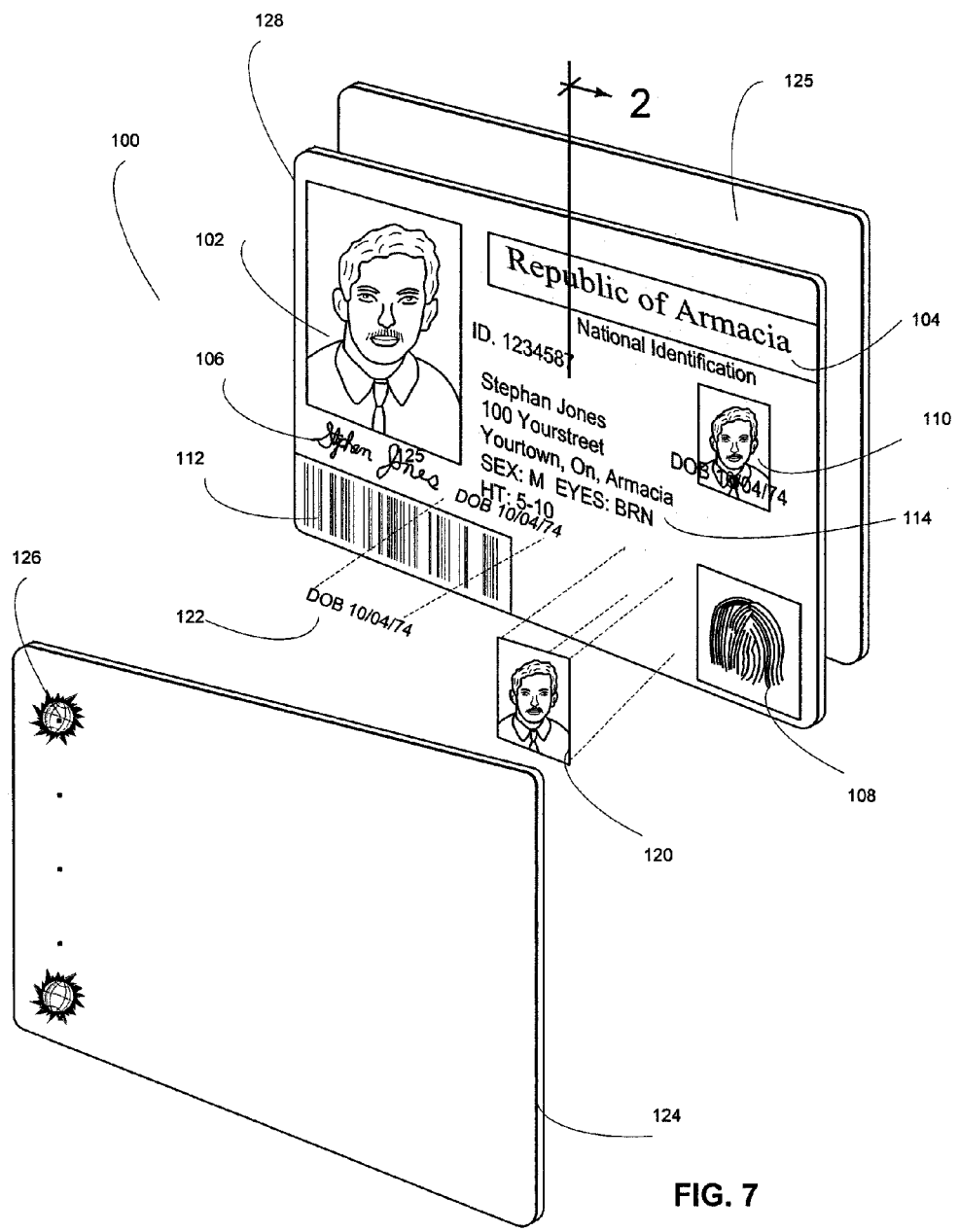
FIG. 7 is an exploded isometric view of an identification document similar to the first embodiment of FIGS. 6A-6B.
Figure 8:
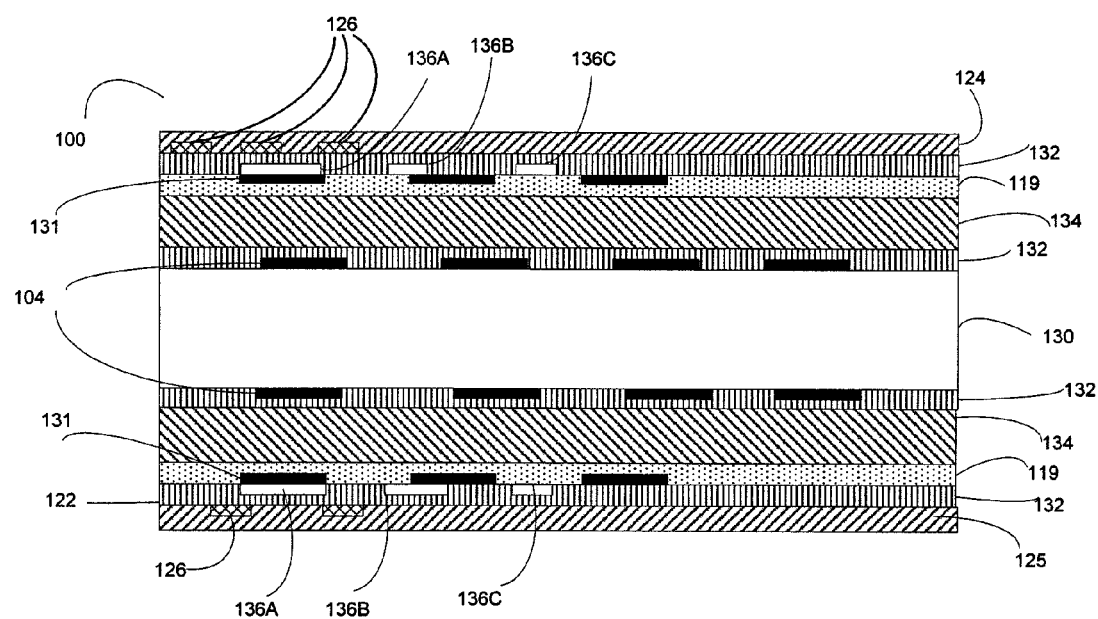
FIG. 8 is a cross-sectional view of the identification document of FIGS. 6A-6B and FIG. 7.
Figure 9:
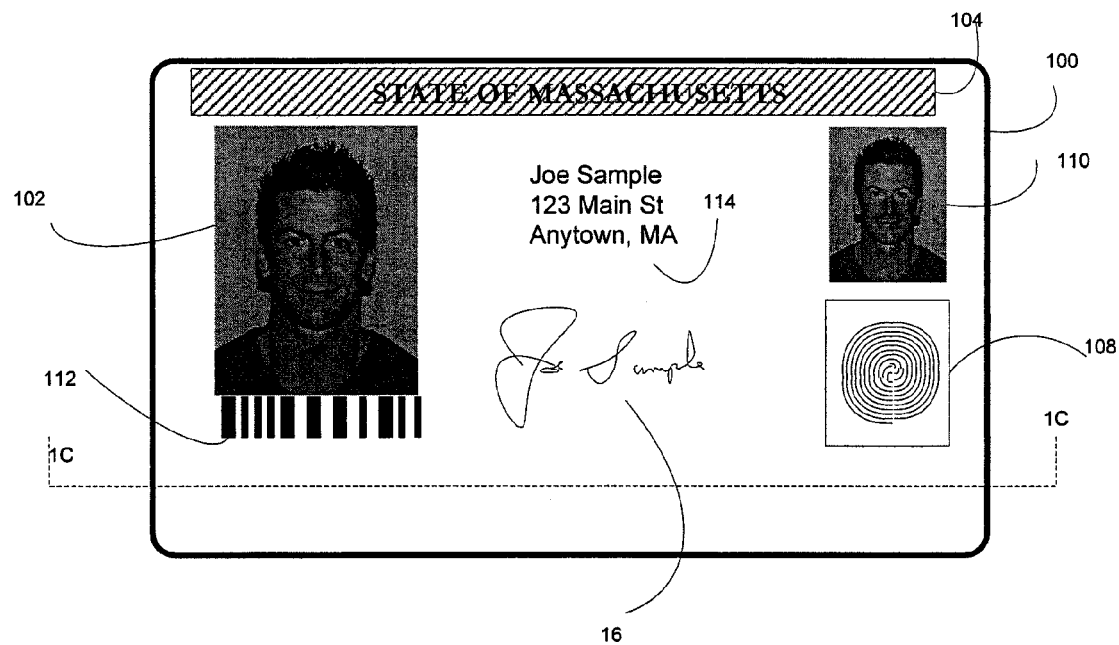
FIGS. 9A-9B are views of a third embodiment of an identification document in accordance with one embodiment of the invention, shown at first and second viewing angles, respectively.
Figure 9:
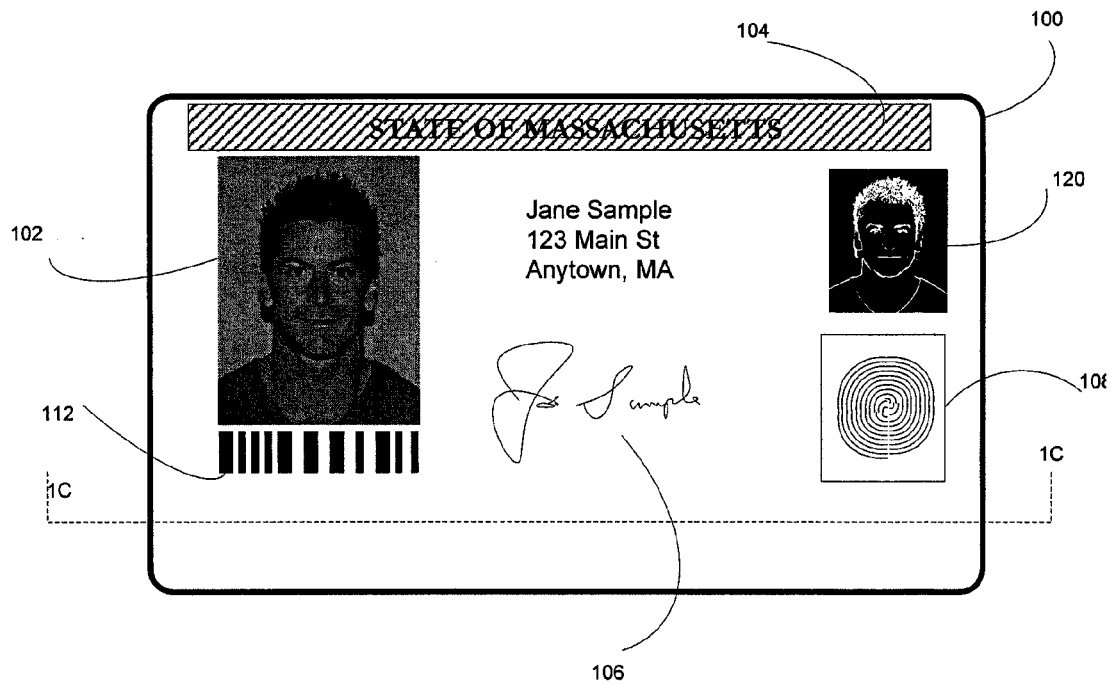

For example, the optically variable birthdate 122 in FIGS. 6-7 is printed so as to align with and appear to be directly over the birthdate that is part of the personal information 114. Note that, in FIG. 6B, the optically variable birthdate 122 is shown for illustrative purposes to be similar to a photographic "negative" or "inverse" of the birthdate in the personal information 114. Further examples of printing the OVDD 136 directly over corresponding variable information 131 are seen in FIGS. 9A-9B, described further below.

FIGS. 9A and 9B illustrate another embodiment of the invention. FIG. 9A illustrates an identification document 100 at a first angle, such that the ghost image 110 is visible. FIG. 9B illustrates the identification document of FIG. 9A at a second angle, such that the optically variable ghost image 120 is visible in the same spot where the original ghost image 110 had previously been visible. Those skilled in the art will appreciate that the optically variable ghost image 120 can be applied over the ghost image 110 such that the ghost image 110 may or may not be visible at the same angle(s) that the optically variable ghost image 120 is visible.

Figure 19:
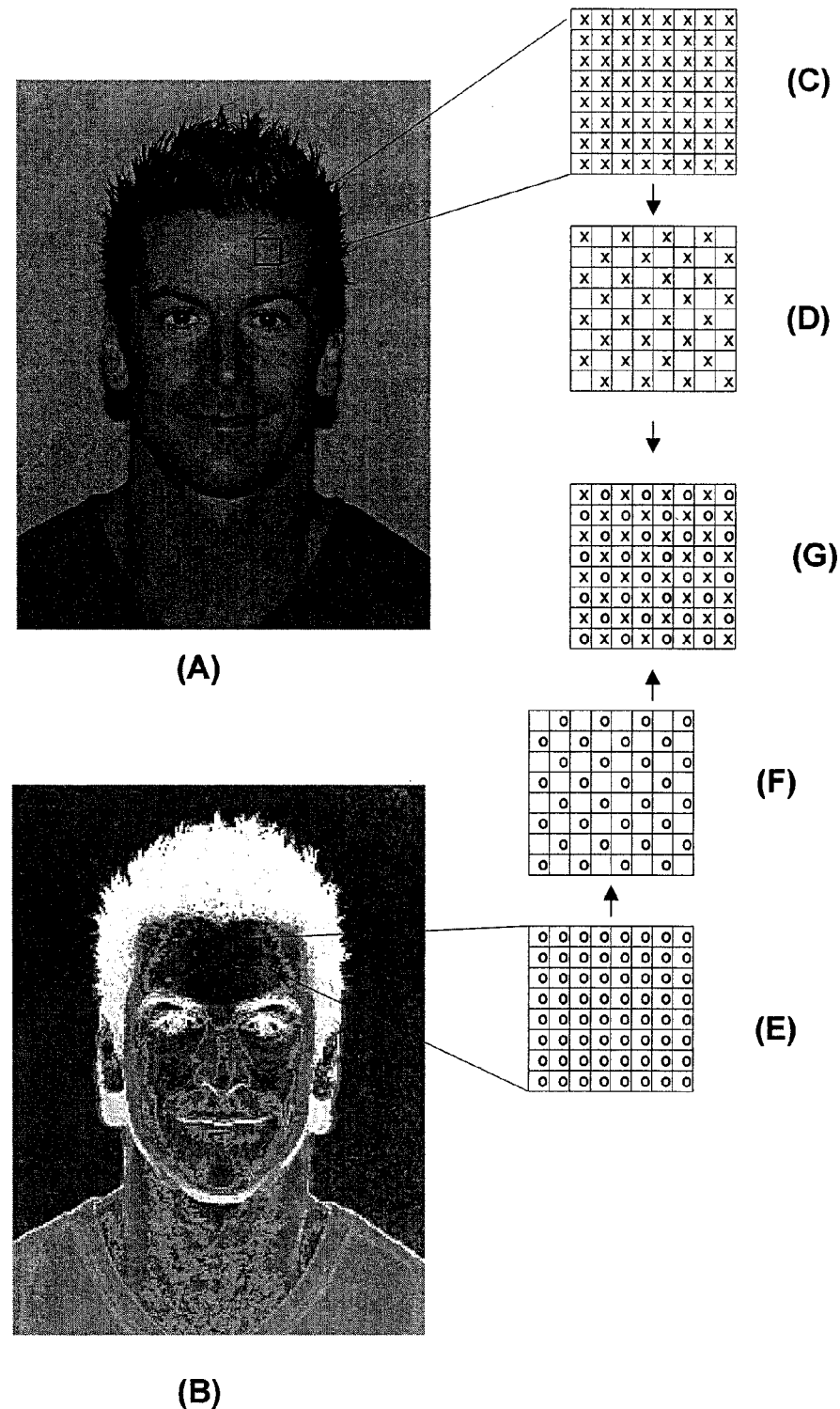
FIGS. 19A-19B are inverted and non-inverted images usable in accordance with at least one embodiment of the invention.
FIGS. 19C-19G illustrate steps in the formation of an interleaved optically variable image, in accordance with one embodiment of the invention.

The optically variable ghost image 120 in this example will generally be printed using optically variable ink. When the optically variable ghost image 120 is generated using any one of the methods in FIGS. 2-4 (or one of the interlacing methods described herein in connection with FIGS. 19 and 20), the optically variable ghost image 120 may have an appearance that is analogous to a photographic "inverse" or "negative" of the visible ghost image 110. We refer to this as one type of a "mirror-like image," although, of course, we recognize that "true" mirror images of a given image, such the image of a face reflected from an actual mirror, in fact show a backwards image. One reason we call this a "mirror-like" image, for at least some embodiments, is because at least some of the optically variable inks (e.g., Table 1) used to print the OVDD 136 create a "mirror-like" sheen or luster when printed. Another reason we call this a "mirror-like" image, for at least some embodiments, is the reflective quality of the image. Another reason we call this a "mirror-like" image is because, in at least some embodiments, the image can have an appearance that is similar is a photographic inverse or negative of the visible image, except printed using optically variable ink Close alignment of the OVDD 136 to a corresponding similar visible image is not, however, required for the invention. As mentioned previously, in at least some embodiments An OVDD 136 can be applied so as partially overlay a variable indicium 131 on the identification document 100, and the variable indicium 13 need not be the same indicium as the OVDD 136. This is shown, for example, in FIG. 6B by the optically variable birthdate 122B that partially overlays the bearer image 102. This is also illustrated in cross section in FIG. 8 with OVDD 136B partially overlaying variable indicium 131. Further, an OVDD 136 can be applied to an identification document so that it does not overlay a variable indicium on the identification document 100, as shown by the optically variable ghost image 120 in FIG. 6B. This is also illustrated in cross section in FIG. 8 by OVDD 136C not overlaying any variable indicium 131. Note that in FIG. 8, the OVDD 136C may be overlaying a fixed indicium 104, but that is not required.

In another example embodiment, a location for an OVDD 136 can be selected that permits the OVDD 136 to be printed in such a way (described further herein) that it is possible to obtain an appearance of a "flipping" image of the OVDD 136 when the identification document is viewed at different angles. This advantageously may be done by printing over an area of the card that does not contain information that would interfere with the appearance of the OVDD 136. The area need not be a substantially blank area of the identification document 100; for example, the area could contain fixed indicia 131 such as background colors, fine line printing, artwork, scrolls, etc.

FIGS. 6C and 6D illustrate an identification document 100 with "mirror-like image flipping" of an OVDD 136 that is not printed so as to be aligned with corresponding variable information. At a first angle (FIG. 6C), an optically variable ghost image having a first tonal appearance 121 is visible. FIG. 6D illustrates the identification document 100 of FIG. 6C when viewed at a second angle, such that the optically variable ghost image 120 of FIG. 6C now has the appearance that appears to be an inverted version of the first tonal appearance. In the embodiment of FIGS. 6C and 6D, we accomplish this by printing an interlaced combination of a bitonal image (e.g., FIG. 5F) and its inverse (FIG. 5G), where one of the images is printed using an optically variable ink and the other is printed using another ink (e.g., an optically variable ink in a different color, a visible ink, a UV or IR ink, etc.) Note, also, that this embodiment of the invention is not limited to use of bitonal images; virtually any type of processed image is usable, including images processed using various types of dithering. We can also achieve a similar effect by printing an interlaced combination of a full color or grayscale image and its inverse. In addition, we note that this embodiment of the invention is not limited to the particular type of interlacing that is illustrated in the figures or described herein. Many different types of interlacing (pixel type, line by line, kernel mode, etc.) are usable with at least some embodiments of the invention, as will be readily appreciated by those skilled in the art.

FIGS. 19A through 19E are an illustrative example of an interlacing process for a full color or a grayscale image and its respective inverse, in accordance with one embodiment of the invention (those skilled in the art will appreciate that the procedure would be similar for a bitonal or monochrome image). FIG. 19A shows a grayscale rendering of a full color image. For each row of pixels in the image (see, e.g., FIG. 19C, which shows an illustrative section of the image showing pixels labeled "X"), we "select" either the odd pixels or even pixels, in an alternating fashion, as shown in FIG. D. (Note that although we illustrate the process only for a small section of the image, it will be appreciated that the process would be similar for the entire image). We can do the same thing for the inverse of the image (FIGS. 19B through F).

At the time of printing, we first print what is in the pixel matrix of FIG. 19D, using a first type of ink (e.g., a visible ink or a first OVD or a covert ink), followed by what is in the pixel matrix of FIG. 19F, using a second type of ink (where the second ink is different than the first type), which results in image printed similar to the pixel matrix of FIG. 19G, where adjacent pixels have been printed with different types of ink. Of course, we can print the pixel matrix of FIG. 19F prior to printing the pixel matrix of FIG. 19D.

FIG. 10 is an exploded isometric view of an identification document 100 that is similar in construction to the identification document 100 of FIGS. 9A-9B and illustrates how the OVDD 136 is disposed between the inner document layer 128 and the outer laminate layer 124 and overlays the visible ghost image. Although not illustrated in FIG. 10, those skilled in the art will appreciate that the OVDD 136 also can be disposed between the inner document layer 128 and the outer laminate layer 124' (i.e., the "back" of the card).

We have found that in another advantageous embodiment of the invention, we can overlay the OVDD 136 over fixed and/or variable information printed in an ink or toner that is not visible to the human eye in ambient light, such as a UV and/or IR based inks, toners, and/or dyes, thermachromic inks, toners, and/or dyes, etc. (we refer to inks or toners not visible to the human eye in ambient light or under normal conditions/temperatures/etc., as "covert" printing materials). In another embodiment, we can also overlay an OVDD 136 with fixed and/or variable information printed using such covert printing materials. This can provide further security advantages to the identification document and make the identification document extremely difficult to forge and/or alter. The covert printing materials can be printed to the identification document in many different ways. For example, they may be pre-printed to the core layer, applied as part of an overlamination process, printed using any previously described printing methods, and, in one advantageous embodiment, printed as part of the D2T2 printing process. This is described further below.

As we discussed in copending and commonly assigned U.S. patent application entitled "Covert Variable Information on Identification Documents and Methods of Making Same", Ser. No. 10/330,032, (the contents of which are hereby incorporated by reference in their entirety), a ribbon for D2T2 printing can be modified to include a panel containing a heat-diffuseable ultraviolet dye in a resin, to permit personalized UV information to be printed as a thermal transfer process. For example, the panel to be modified can replace a mass-transfer "K" panel in the ribbon. We have found that we can modify this panel to include optically variable materials, as well, and that specific printing techniques can enable these optically variable materials to be used to print variable information in a "mirror-like image" format, to create a security feature for identification documents.

Figure 18:
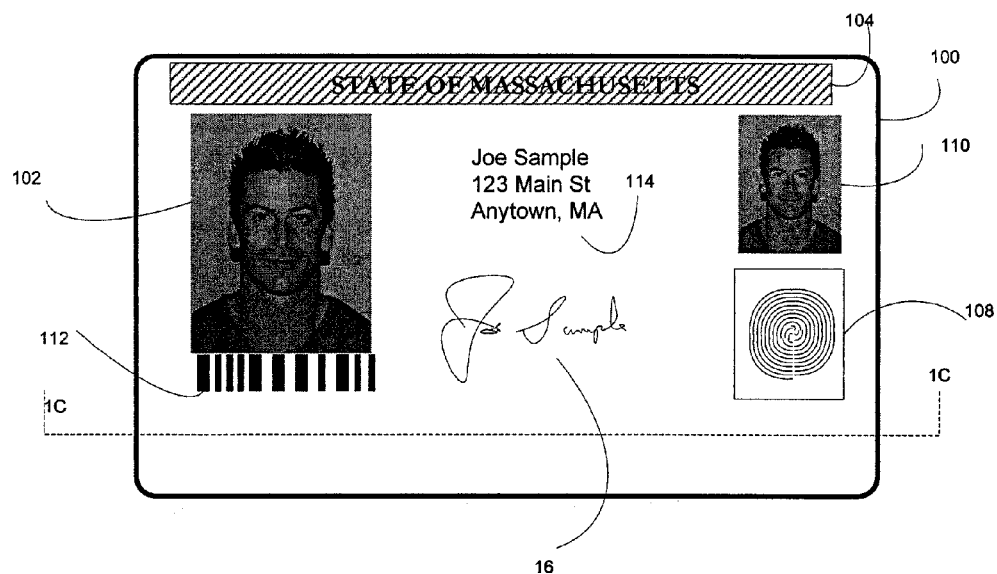
FIGS. 18A-18B are illustrations of a fourth embodiment of an identification document shown at first and second angles, in accordance with at least one embodiment of the invention.
Figure 18:
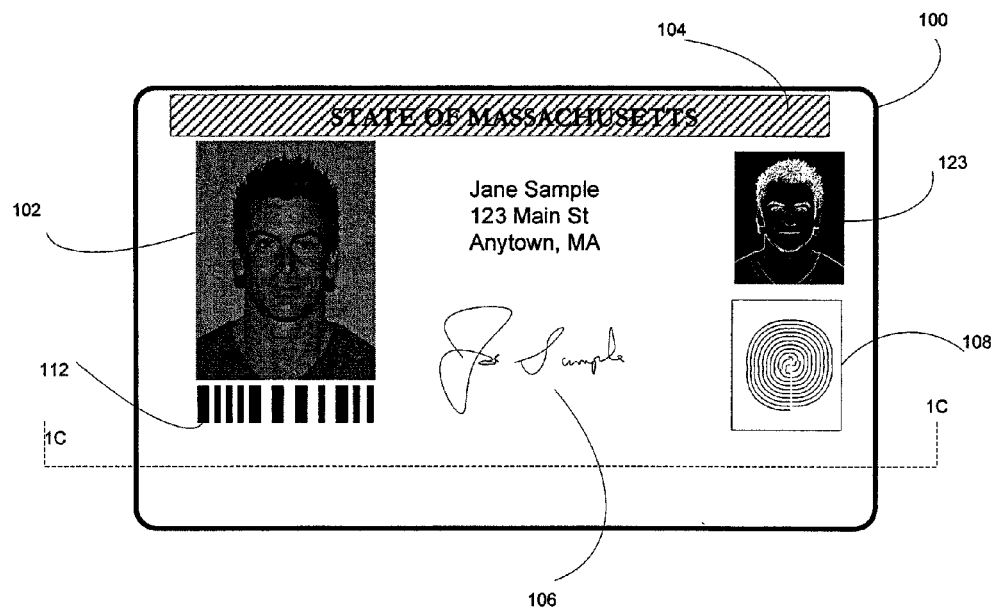

In one embodiment of the present invention, we have developed a D2T2 printing ribbon adapted for overlaying an OVDD 136 with a convert material (or vice versa). Many of these embodiments can be accomplished, for example, using a ribbon constructed like the example shown in FIGS. 18A (top view of ribbon) and 18B (cross sectional view of combination panel 150, during the printing process). FIG. 16A illustrates a view of a D2T2 ribbon 180, containing Y, M, and C panels (similar to the Y, M, and C panels of the ribbon 180 of FIG. 15A). In addition, the ribbon 180 includes a layered panel 158 containing both a thermally transferable UV ink layer 204 and a thermally transferable OVD ink layer 198.

In one example, the layered panel 158 is constructed as shown in the cross-sectional view of FIG. 16B (in which the transferable ink layer of OVD 198 is arranged such that, upon printing, it will overlay the transferable ink layer of covert material 204). The transferable ink layers 198, 204 each contain, in addition to the appropriate OVD pigment (e.g., those in Table 1) or covert pigment(s), various polymers, solvents and additives that enable the layer to be thermally transferable by D2T2 printing (such polymers, solvents, and additives are well known to those skilled in the art and not detailed here).

The layered panel 158 also includes a hard coat 194, which in this example is a layer of a substantially heat-resistant material capable of withstanding the temperature of the thermal head 200 during the printing process. For example, we have used for the hard coat 194 a thin film of UV curable acrylate or silica, which we have found to be capable of withstanding the heat of a print head at (e.g., 250-300 degrees Celsius). (Note that this thin film of heat resistant material also can coat the dye diffusion panels 152, 154, 156.). The layered panel 158 also includes a thin film 196 (e.g., of PET) over which the hard coat 194 is applied. A layer of release coating 192 is disposed between the hard coat 194/thin film 196 and the thermally transferable ink layers. As FIG. 16B illustrates, when the thermal print head 200 strikes the layered panel 158 of the ribbon, the pixel 202 is printed to the inner document layer 128, which in this example is, for illustrative purposes, shown to be an ID card layer.

Figure 11:
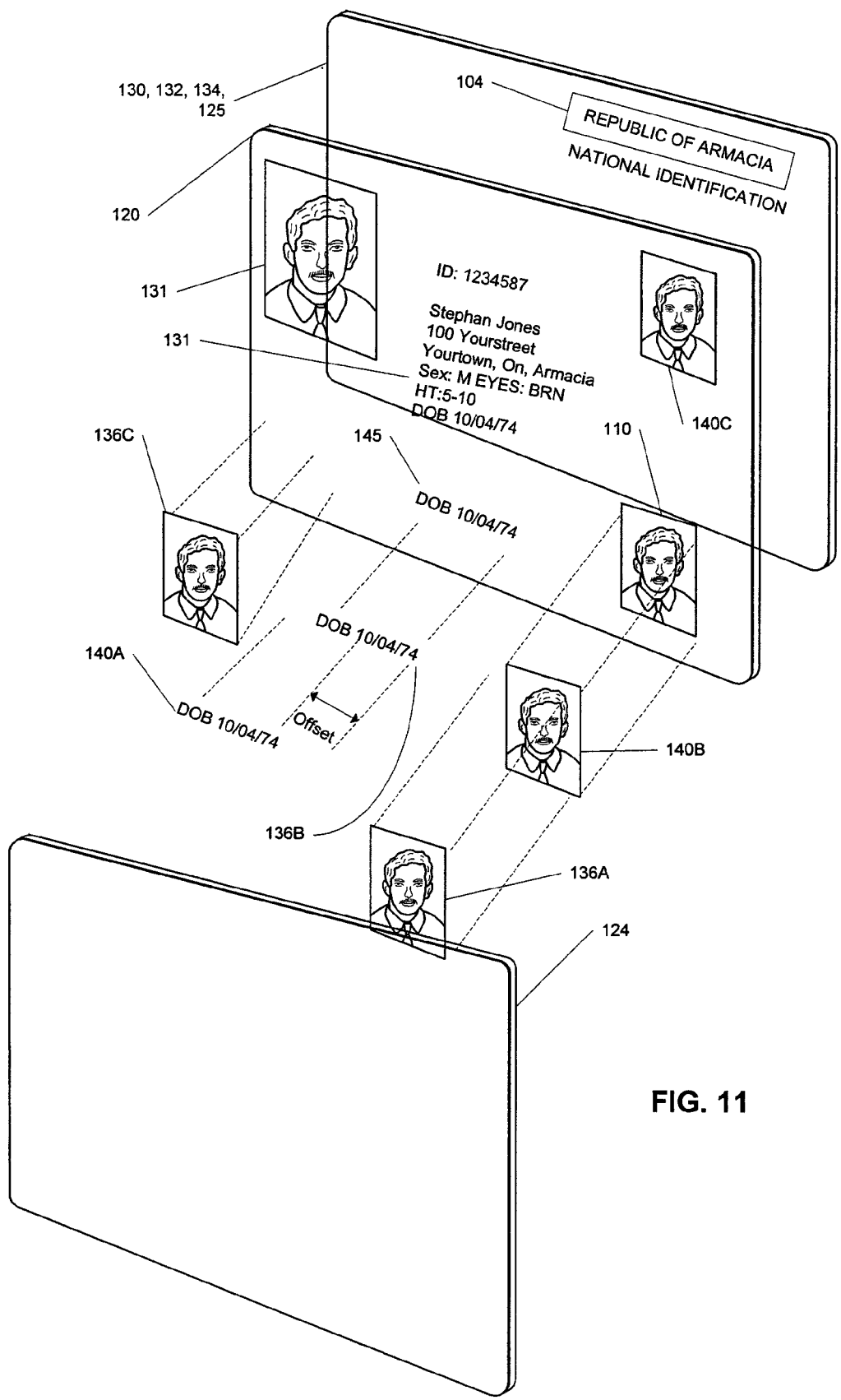
FIG. 11 is an exploded isometric view of an identification document in accordance with a fifth embodiment of the invention.
Figure 12:
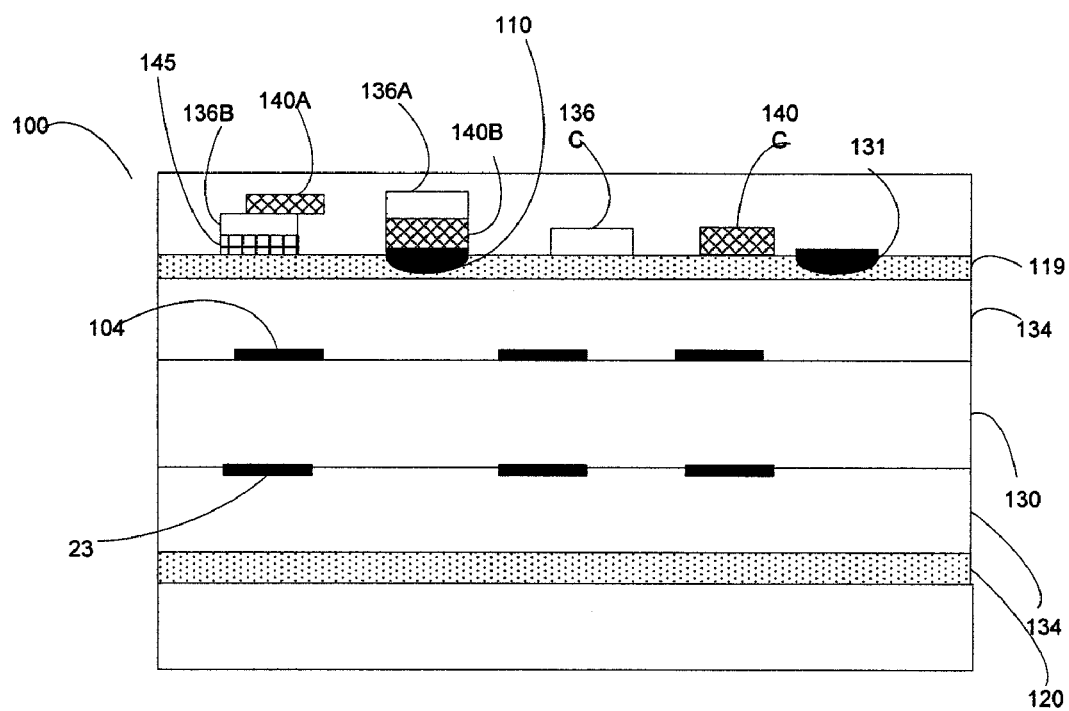
FIG. 12 is a cross-sectional view of the identification document of FIG. 11.
Figure 13:
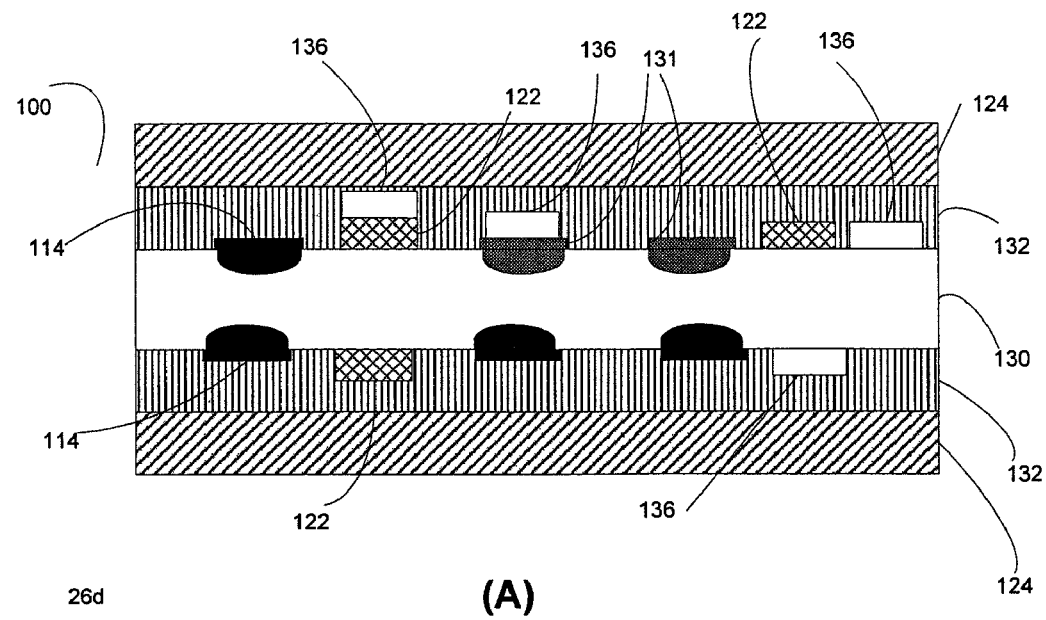
FIGS. 13A and 13B are cross sectional views of identification documents in accordance with sixth and seventh embodiments of the invention.
Figure 13:
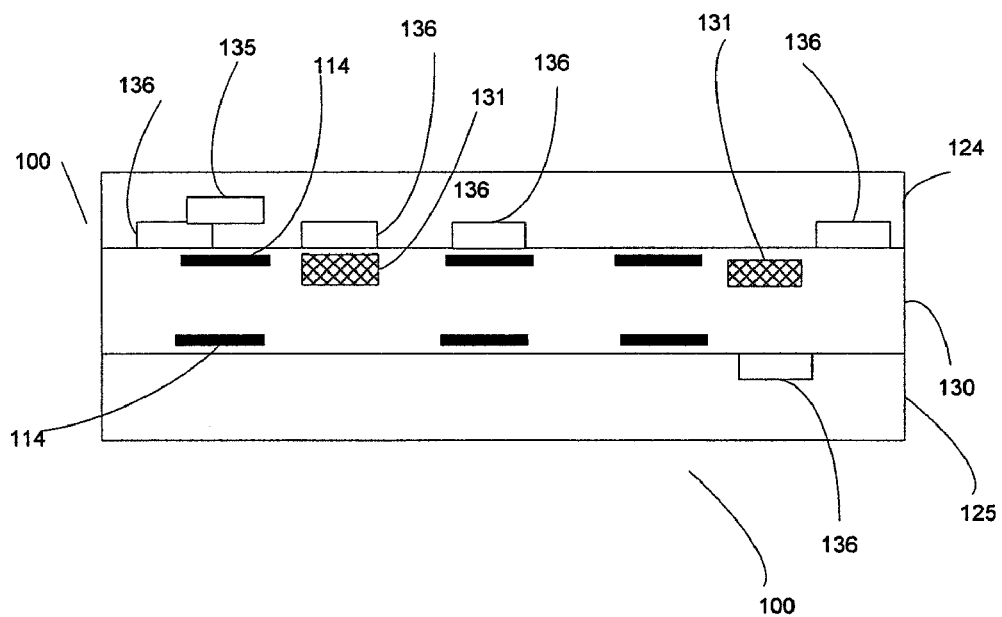

An illustrative example embodiment of an identification document 100 in which the optically variable indicia can completely or partially overlay a non-visible indicia is shown in FIG. 11, which is an exploded isometric view of an identification document in accordance with a fourth embodiment of the invention, and FIG. 12 is a cross-sectional view of the identification document of FIG. 11. Note that in FIG. 11, all indicia are shown as "visible" for purposes of illustrating how the identification document 100 is constructed.

In FIGS. 11 and 12, it can be seen that OVDD 136A is aligned with and overlays a corresponding covert indicia 140B (in this example, it is a UV indicia), which itself is aligned with and overlays a ghost image 110. Note that in the cross sectional view of FIG. 12, the ghost image 110 is somewhat diffused into the image receiving layer 119 In addition, it should be understood that illustrating OVDD 136A as overlaying the covert indicia 140B in FIGS. 11 and 12 is not intended to be limiting; as noted previously, the identification document 100 can be printed such that the covert indicia 140B overlays the OVDD 136A.

FIGS. 11 and 12 also illustrate several other embodiments of the invention. For example, OVDD 136C is printed so that it is not overlaying other information on the identification document 100 and is not overlaid by covert materials. Note that OVDD 136 would not be printed using the ribbon of FIGS. 16A-B, but rather could be printed using the ribbon of FIG. 15A-B.

In another embodiment, referring again to FIGS. 11 and 12, a visibly printed birthdate 145 is overlaid by and in alignment with optically variable printed birthdate (OVDD 136B). The OVDD 136B which is overlaid by a covertly printed birthdate 140, where the covertly printed birthdate 140 only partially overlays the OVDD 136B (i.e., is not in complete alignment). This embodiment would not be printed using the ribbon of FIGS. 16A-B, but could be printed using the ribbon of FIGS. 15A-15B as adapted to include a covert panel. This is shown in FIGS. 16C-D. The ribbon of FIGS. 16C-16D is similar to the ribbon of FIGS. 15A-15B except that it includes a panel that can contain either a second OVD material or a covert material (there also can be two covert materials). The two panels shown in FIG. 16C can be achieved, for example, by constructing the ribbon to have an additional thermal transfer panel or, as shown in FIG. 16C, by subdividing the panel 158 into sub panels 1513A and 158B (which panels are shown purely for illustration only as being the same size—they need not be, of course). The separate panels permit printing the OVDD 136 and the covert printing 140.

Another embodiment of the invention is shown in FIGS. 17A and 17B. In this embodiment, the ribbon 180 includes a combination panel 164 containing a single transferable ink layer 206 that contains a mixture of an optically variable material and a covert material, which can be printed as pixel 202 to form an image that has both an optically variable quality and a covert quality. For example, FIG. 17C illustrates an identification card printed using the ribbon of FIG. 17A at a first angle and under a first condition, that has been printed with a ghost image of the bearer that is only visible at certain angles and/or under certain conditions (in this example, UV light). In the example of FIG. 17C, the first angle is not an angle that permits the optically variable ghost image 120 (FIG. 17D) to be visible, and the first condition is not one that permits the covert ghost image 121 (FIG. 12E) to be visible.

In FIG. 17D, the identification document 100 is at an angle permitting the optically variable ghost image 120 to become visible. In FIG. 17E, the identification document 100 is at a certain condition (e.g., being illuminated with ultraviolet light) that permits the covert ghost image 121 to be visible. Note that the covert ghost image 121 is shown in FIG. 17D as being printed as the "inverse" or "photographic negative" of the optically variable ghost image 120. This is but one possible implementation, and it is not limiting. The covert ghost image 121 could be printed as the same image as the optically variable ghost image 120, in which case the covert ghost image 120 would have the same appearance as the optically variable ghost image 120.

Embodiments of the invention can also be implemented using other printing methodologies besides D2T2 printing. For example, the interlacing techniques described herein can easily be achieved as part of a laser xerography or HP Indigo type printing process. We also anticipate that at least some embodiments of the invention can be implemented using technologies such as the Xerox GLOSSMARK technology (announced in a press release at http://www.xeroxtechnology.com/ip1.nsf/sedan1?readform&doctype=news07312003).

In another example, FIG. 13A illustrates an embodiment of the invention where an OVDD 136 and/or covert indicia 122 are applied to an identification document 100 that has previously been printed using inkjet printing (an illustrative example of one type of inkjet printing on ID documents is described in our commonly assigned patent application entitled "Identification Card Printed With Jet Inks and Systems and Methods of Making Same", Ser. No. 10/289,962, published on Nov. 13, 2003 as U.S. patent publication no. 2003/0211296A1, which document is hereby incorporated by reference). Referring again to FIG. 13A, the identification document 100 includes a core 130 that comprises a material capable of being imaged with fixed indicia 114 and variable indicia 131 by inkjet printing (or at least by specific formulations of inkjet inks). The OVDD 136 and/or covert indicia 122 can be applied using any of the previously described ribbons and associated processes. The OVDD and/or covert indicia 122 also can by applied by adding the optically varying and/or covert pigments to an appropriate vehicle material and applying these materials by inkjet printing.

We have used silica filled polyolefin material (e.g., TESLIN) as the core 130, and have printed to it using inks described in the Ser. No. 10/289,962 application). It also is possible to use specially prepared TESLIN (e.g., TESLIN coated with appropriate materials) and conventional ink jet ink. Inventors Robert Jones, Dennis Mailloux, and Daoshen Bi, filed Nov. 6, 2002).

Figure 14:
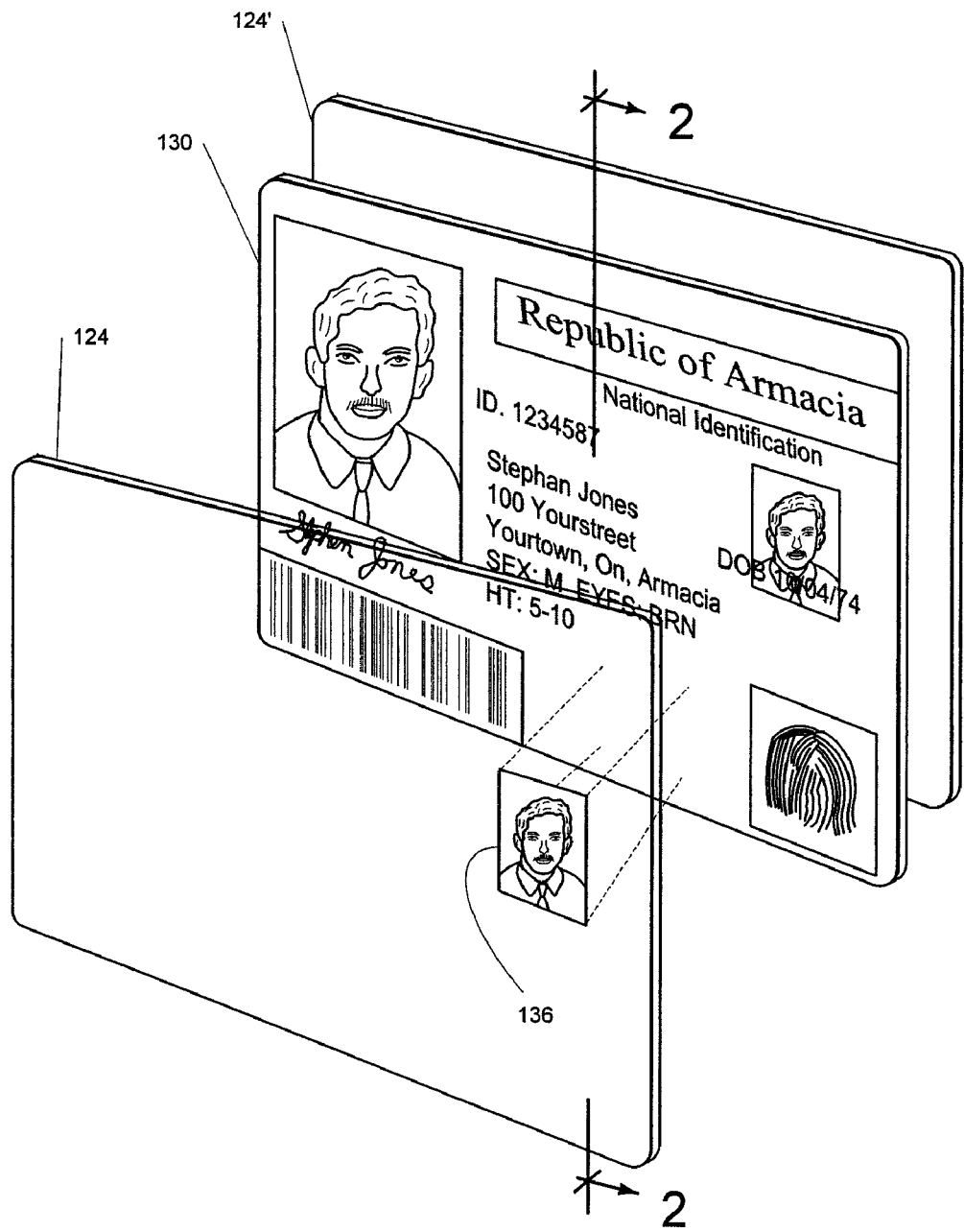
FIG. 14 is an exploded isometric view of an identification document.

FIG. 8 is a cross sectional view an embodiment of the invention that combines the OVDD 136 of the invention with laser engraving, into an identification document 100, and FIG. 14 is an exploded perspective view of a laser engraved identification document 100 in accordance with an embodiment of the invention. As those skilled in the art recognize, laser engraving (sometimes referred to as laser marking) is another method for printing to identification documents. With laser engraving the fixed information 114 and variable information 131 is written to the core 130 such that it is "within" the core rather than at the surface of the core. An OVDD 136 can be applied to the core 130 in the same manner as it would for any other printing example described herein, but in this example an overlaminate 124 preferably is applied to protect the OVDD 136 (laser engraved cards OVDD 136 (laser engraved cards ordinarily do not require overlaminate). We expressly contemplate that any of the techniques described herein (including interlacing and mirror-like image "flipping")) can be readily adapted to many different types of laser engraving processes and compositions, including but not limited to those described in commonly assigned patent application Ser. No. 10/326,886, entitled "Laser Engraving Methods and Compositions, and Articles Having Laser Engraving Thereon", the contents of which are hereby incorporated by reference, and 60/504,352, entitled "Laser Engraving Methods and Compositions and Articles Having Laser Engraving Thereon," the contents of which are hereby incorporated by reference.

In another embodiment, we can create a lustrous image on an identification document by a type of interlacing, using a combination of a visible ink and an optically variable ink, which can be printed using one of the D2T2 ribbons described herein. FIGS. 18A and 18B illustrate an identification document containing a ghost image 110 and a lustrous ghost image 123 (in a single location). FIGS. 20A-20E illustrate a flow chart and illustrative digital images showing a method for printing this method. Assume that the image of FIG. 20B is the image to be printed (the principles are, of course, applicable to virtually any image). We can define a first subset of pixels (FIG. 20C) to be printed using a first type of ink, and a second subset of pixels (FIG. 20D) to be printed using a second type of ink, resulting in the image of FIG. 20E when printed (of course the order can be reversed). When at least one of the types of ink that is selected is an optically variable ink, we have found that the resultant visible printed image appears to "shine" or have a "luster" as a result of the interlaced optically variable ink that is part of the image. This is still another example of an "optically variable mirror-like image" security feature, in accordance with one embodiment of the invention.

Figure 20:
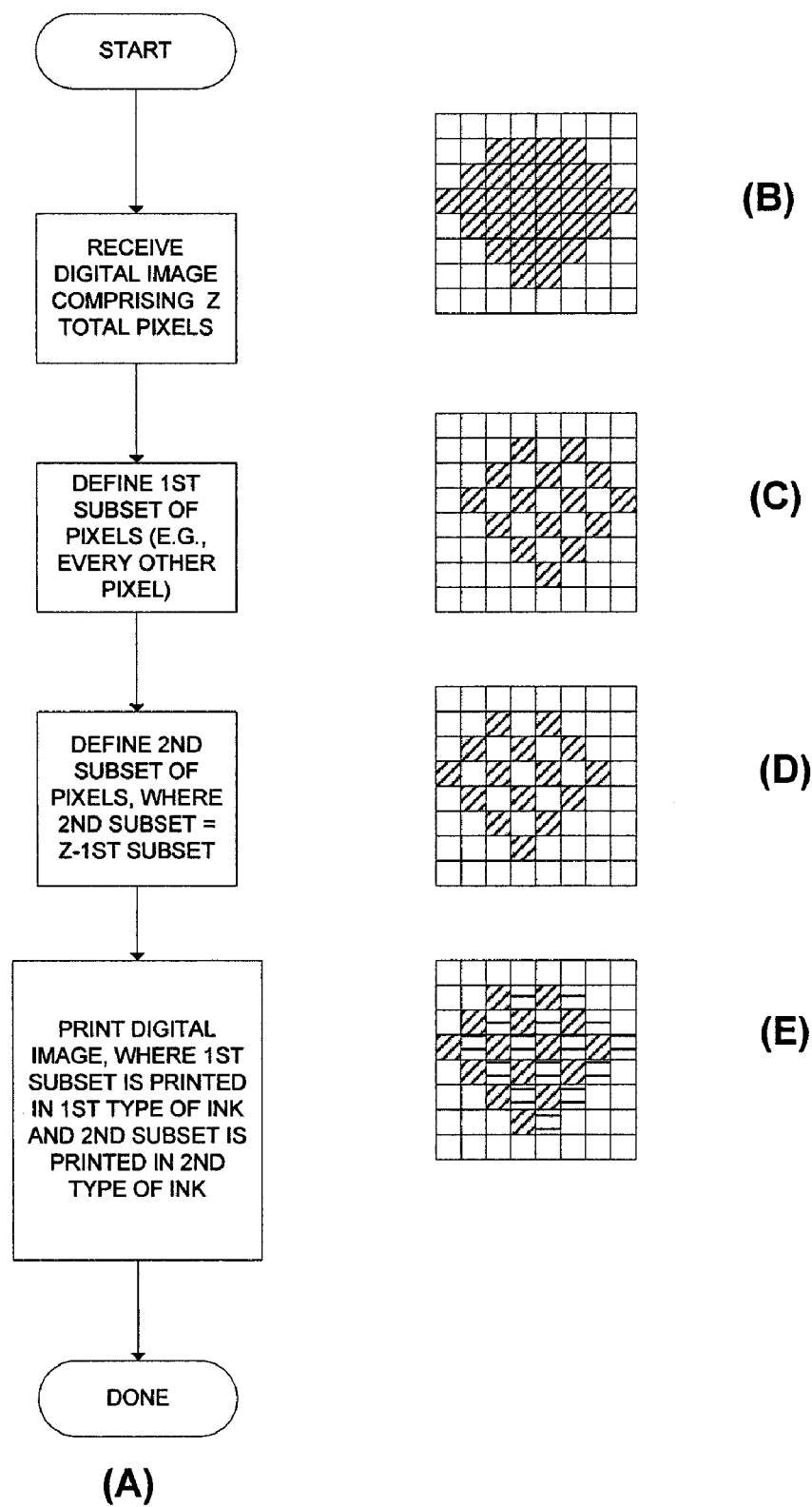
FIGS. 20A-20E are a flow chart and accompanying images illustrating a process for printing an interleaved image from two different media, in accordance with one embodiment of the invention.

We also expect that there are many variations of the interlacing proposed in FIG. 20 which can produce different effects. For example, the amount of sheen or luster can vary depending on the portion of pixels that are selected to be printed using the optically variable medium. Another example of adding a sheen to an given image could also be produced by overlaying (or interlacing) a visible representation of the given image with a processed image that consists of selected parts of the given image, such as the edges (e.g., FIGS. 5C and 5D).

Concluding Remarks

Having described and illustrated the principles of the technology with reference to specific implementations, it will be recognized that the technology can be implemented in many other, different, forms, and in many different environments.

The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that while many of the Figures shown herein illustrate a particular species of ID document—a driver's license—the present invention is not so limited. Indeed our inventive methods and techniques apply generally to all identification documents defined above. Moreover, our techniques are applicable to non-ID documents, e.g., such as printing or forming covert images on physical objects, holograms, etc., etc. Further, instead of ID documents, the inventive techniques can be employed with product tags, product packaging, business cards, bags, charts, maps, labels, etc., etc., particularly those items including providing a non-visible indicia, such as an image information on an over-laminate structure. The term ID document is broadly defined herein to include these tags, labels, packaging, cards, etc. In addition, while some of the examples above are disclosed with specific core components, it is noted that—laminates can be sensitized for use with other core components. For example, it is contemplated that aspects of the invention may have applicability for articles and devices such as compact disks, consumer products, knobs, keyboards, electronic components, decorative or ornamental articles, promotional items, currency, bank notes, checks, etc., or any other suitable items or articles that may record information, images, and/or other data, which may be associated with a function and/or an object or other entity to be identified.

It should be understood that while our some of our detailed embodiments described herein use UV, IR, thermachromic, and optically variable inks and/or dyes by way of example, the present invention is not so limited. Our inventive techniques and methods will improve the visibility and crispness of infrared and other fluorescing images as well, and we expect that our inventive techniques and methods can be used to provide "mirror-like image" and/or "iridescent" effect to many different types of images (including but not limited to fixed indicia, characters, background art, etc.). The inventive techniques and methods can improve the visibility and crispness of thermachromic inks and resins (i.e., inks and resins whose appearance changes and/or becomes visible with temperature changes). Moreover, our inventive techniques are useful for preprocessing images destined for ID documents using various printing processes including, but not limited to, dye infusion, mass-transfer, laser xerography, ink jet, wax transfer, variable dot transfer, and other printing methods by which a fluorescing image can be formed.

It should be appreciated that the methods described above with respect to FIGS. 1-20, as well as the methods for implementing and embedding digital watermarks, can be carried out on a general-purpose computer. These methods can, of course, be implemented using software, hardware, or a combination of hardware and software. We note that some image-handling software, such as Adobe's PrintShop, as well as image-adaptive software such as LEADTOOLS (which provide a library of image-processing functions and which is available from LEAD Technologies, Inc., of Charlotte, N.C.) can be used to facilitate these methods, including steps such as providing enhanced contrast, converting from a color image to a monochromatic image, thickening of an edge, dithering, registration, etc. An edge-detection algorithm may also be incorporated with, or used in concert with, such software. Computer executable software embodying the FIGS. 2-4 steps, or a subset of the steps, can be stored on a computer readable media, such as a diskette, removable media, DVD, CD, hard drive, electronic memory circuit, etc.).

To provide a comprehensive disclosure without unduly lengthening the specification, applicants hereby incorporate by reference each of the U.S. patent documents referenced above.

The technology and solutions disclosed herein have made use of elements and techniques known from the cited documents. Other elements and techniques from the cited documents can similarly be combined to yield further implementations within the scope of the present invention. Thus, for example, single-bit watermarking can be substituted for multi-bit watermarking, technology described as using imperceptible watermarks or encoding can alternatively be practiced using visible watermarks (glyphs, etc.) or other encoding, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption, etc. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

What is claimed is:

1. An identification document comprising:
  a document layer comprising a material for receiving printing of thermally transferable optically variable pigment;
  a first indicium printed on the document layer, the first indicium being printed to the document layer by a thermally transferred optically variable pigment;
  the first indicium being at least partially overlaid with a second indicium printed to the document layer by a thermally transferred covert pigment,
  wherein the first and the second indicia are printed on the document layer by:
  disposing a thermally transferable optically variable pigment in a mass transfer panel of a printer ribbon configured for dye diffusion thermal transfer printing or mass transfer printing to form a first layer;
  disposing a thermally transferable covert pigment in the mass transfer panel to form a second layer over the first layer;
  printing the first and second indicia as part of a mass transfer printing process, such that, the second indicium printed in covert pigment at least partially overlays the first indicium printed in optically variable pigment; and
  wherein the first indicium comprises a digital image, the digital image formed by:

providing an initial image that is to be used as a model to generate the optically variable image, the digital image comprising personalized data;

detecting edges or boundaries within the digital image, the detected edges or boundaries forming an intermediate image; and emphasizing the edges or boundaries within the intermediate image.

2. The identification document of claim 1 wherein the thermally transferred optically variable pigment is selected and printed such that the first indicium has at least one of a luster, shine, sheen, pearlescent appearance, iridescent appearance, and minor-like appearance.

3. The identification document of claim 1, wherein the first indicium and second indicium are based upon the same digital image, wherein:

the first indicium comprises a first portion of pixels of the digital image; and the second indicium comprises a second portion of pixels of the digital image.

4. The identification document of claim 3, wherein the first portion of pixels differs from the second portion of pixels.

5. The identification document of claim 3, wherein the first portion of pixels is the inverse of the second portion of pixels.

6. The identification document of claim 3, wherein the first portion of pixels is printed using a first optically variable printing medium and the second portion of pixels is printed using a second optically variable printing medium.

7. The identification document of claim 1 wherein the second indicium comprises an image that is substantially identical to the first indicium.

8. The identification document of claim 1 further comprising a third indicium, the third indicium being substantially identical to the first and second indicia.

9. The identification document of claim 1 wherein at least a portion of the third indicium overlays at least one of the first and second indicia.

10. The identification document of claim 1 wherein the first, second, and third indicia are interlaced.

11. The identification document of claim 1 wherein the first and second indicia are interlaced.

12. The identification document of claim 1, wherein the first and second indicia are selected and printed so as to give the appearance of a single image having an appearance that shifts from a positive image to a negative image depending on the angle of viewing.

\* \* \* \* \*